United States Patent
Simpson et al.

(10) Patent No.: US 10,099,284 B2
(45) Date of Patent: Oct. 16, 2018

(54) METHOD AND ASSEMBLY FOR FORMING COMPONENTS HAVING A CATALYZED INTERNAL PASSAGE DEFINED THEREIN

(71) Applicant: General Electric Company, Schenectady, NY (US)

(72) Inventors: Stanley Frank Simpson, Simpsonville, SC (US); Canan Uslu Hardwicke, Simpsonville, SC (US); Joseph Leonard Moroso, Greenville, SC (US); Timothy Michael Moricca, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 14/973,590

(22) Filed: Dec. 17, 2015

(65) Prior Publication Data

US 2017/0173684 A1  Jun. 22, 2017

(51) Int. Cl.
```
B22D 19/00    (2006.01)
B22D 25/02    (2006.01)
B22C 9/10     (2006.01)
F23R 3/40     (2006.01)
B33Y 10/00    (2015.01)
B33Y 80/00    (2015.01)
```

(52) U.S. Cl.
CPC ............... B22D 25/02 (2013.01); B22C 9/10 (2013.01); B22D 19/0072 (2013.01); F23R 3/40 (2013.01); B33Y 10/00 (2014.12); B33Y 80/00 (2014.12)

(58) Field of Classification Search
CPC .. B22C 3/00; B22C 9/10; B22C 9/106; B22C 9/108; B22C 9/24; B22D 19/0072; B22D 25/02; B22D 29/002

USPC ......... 164/24, 28, 33, 35, 91, 132, 365, 366, 164/367, 369

See application file for complete search history.

(56) References Cited

U.S. PATENT DOCUMENTS

| 2,687,278 A | 8/1954 | Smith et al. |
| 2,756,475 A | 7/1956 | Hanink et al. |
| 2,991,520 A | 7/1961 | Dalton |

(Continued)

FOREIGN PATENT DOCUMENTS

| CH | 640440 A5 | 1/1984 |
| EP | 0025481 A1 | 3/1981 |

(Continued)

OTHER PUBLICATIONS

Ziegelheim, J. et al., "Diffusion bondability of similar/dissimilar light metal sheets," Journal of Materials Processing Technology 186.1 (May 2007): 87-93.

(Continued)

*Primary Examiner* — Kevin P Kerns
(74) *Attorney, Agent, or Firm* — Armstrong Teasdale LLP

(57) ABSTRACT

A method of forming a component having an internal passage defined therein includes positioning a jacketed core with respect to a mold. The jacketed core includes a hollow structure formed from at least a first material and a first catalyst, and an inner core disposed within the hollow structure. The method also includes introducing a component material in a molten state into a cavity of the mold, and cooling the component material in the cavity to form the component. The inner core defines the internal passage within the component.

23 Claims, 11 Drawing Sheets

(56) References Cited

U.S. PATENT DOCUMENTS

| | | |
|---|---|---|
| 3,160,931 A | 12/1964 | Leach |
| 3,222,435 A | 12/1965 | Mellen, Jr. et al. |
| 3,222,737 A | 12/1965 | Reuter |
| 3,475,375 A | 10/1969 | Yates |
| 3,563,711 A | 2/1971 | Hammond et al. |
| 3,596,703 A | 8/1971 | Bishop et al. |
| 3,597,248 A | 8/1971 | Yates |
| 3,662,816 A | 5/1972 | Bishop et al. |
| 3,678,987 A | 7/1972 | Kydd |
| 3,689,986 A | 9/1972 | Takahashi et al. |
| 3,694,264 A | 9/1972 | Weinland et al. |
| 3,773,506 A | 11/1973 | Larker et al. |
| 3,824,113 A | 7/1974 | Loxley et al. |
| 3,844,727 A | 10/1974 | Copley et al. |
| 3,863,701 A | 2/1975 | Niimi et al. |
| 3,866,448 A | 2/1975 | Dennis et al. |
| 3,921,271 A | 11/1975 | Dennis et al. |
| 3,996,048 A | 12/1976 | Fiedler |
| 4,096,296 A | 6/1978 | Galmiche et al. |
| 4,130,157 A | 12/1978 | Miller et al. |
| 4,148,352 A | 4/1979 | Sensui et al. |
| 4,236,568 A | 12/1980 | Larson |
| 4,285,634 A | 8/1981 | Rossman et al. |
| 4,352,390 A | 10/1982 | Larson |
| 4,372,404 A | 2/1983 | Drake |
| 4,375,233 A | 3/1983 | Rossmann et al. |
| 4,417,381 A | 11/1983 | Higginbotham |
| 4,432,798 A | 2/1984 | Helferich et al. |
| 4,557,691 A | 12/1985 | Martin et al. |
| 4,576,219 A | 3/1986 | Uram |
| 4,583,581 A | 4/1986 | Ferguson et al. |
| 4,604,780 A | 8/1986 | Metcalfe |
| 4,637,449 A | 1/1987 | Mills et al. |
| 4,738,587 A | 4/1988 | Kildea |
| 4,859,141 A | 8/1989 | Maisch et al. |
| 4,905,750 A | 3/1990 | Wolf |
| 4,911,990 A | 3/1990 | Prewo et al. |
| 4,964,148 A | 10/1990 | Klostermann et al. |
| 4,986,333 A | 1/1991 | Gartland |
| 5,052,463 A | 10/1991 | Lechner et al. |
| 5,083,371 A | 1/1992 | Leibfried et al. |
| 5,243,759 A | 9/1993 | Brown et al. |
| 5,248,869 A | 9/1993 | Debell et al. |
| 5,273,104 A | 12/1993 | Renaud et al. |
| 5,291,654 A | 3/1994 | Judd et al. |
| 5,295,530 A | 3/1994 | O'Connor et al. |
| 5,332,023 A | 7/1994 | Mills |
| 5,350,002 A | 9/1994 | Orton |
| 5,355,668 A | 10/1994 | Weil et al. |
| 5,371,945 A | 12/1994 | Schnoor |
| 5,387,280 A | 2/1995 | Kennerknecht |
| 5,394,932 A | 3/1995 | Carozza et al. |
| 5,398,746 A | 3/1995 | Igarashi |
| 5,413,463 A | 5/1995 | Chin et al. |
| 5,465,780 A | 11/1995 | Muntner et al. |
| 5,467,528 A | 11/1995 | Bales et al. |
| 5,468,285 A | 11/1995 | Kennerknecht |
| 5,482,054 A | 1/1996 | Slater et al. |
| 5,498,132 A | 3/1996 | Carozza et al. |
| 5,505,250 A | 4/1996 | Jago |
| 5,507,336 A | 4/1996 | Tobin |
| 5,509,659 A | 4/1996 | Igarashi |
| 5,524,695 A | 6/1996 | Schwartz |
| 5,569,320 A | 10/1996 | Sasaki et al. |
| 5,611,848 A | 3/1997 | Sasaki et al. |
| 5,664,628 A | 9/1997 | Koehler et al. |
| 5,679,270 A | 10/1997 | Thornton et al. |
| 5,738,493 A | 4/1998 | Lee et al. |
| 5,778,963 A | 7/1998 | Parille et al. |
| 5,810,552 A | 9/1998 | Frasier |
| 5,820,774 A | 10/1998 | Dietrich |
| 5,909,773 A | 6/1999 | Koehler et al. |
| 5,924,483 A | 7/1999 | Frasier |
| 5,927,373 A | 7/1999 | Tobin |
| 5,947,181 A | 9/1999 | Davis |
| 5,951,256 A | 9/1999 | Dietrich |
| 5,976,457 A | 11/1999 | Amaya et al. |
| 6,029,736 A | 2/2000 | Naik et al. |
| 6,039,763 A | 3/2000 | Shelokov |
| 6,041,679 A | 3/2000 | Slater et al. |
| 6,068,806 A | 5/2000 | Dietrich |
| 6,186,741 B1 | 2/2001 | Webb et al. |
| 6,221,289 B1 | 4/2001 | Corbett et al. |
| 6,234,753 B1 | 5/2001 | Lee |
| 6,244,327 B1 | 6/2001 | Frasier |
| 6,251,526 B1 | 6/2001 | Staub |
| 6,327,943 B1 | 12/2001 | Wrigley et al. |
| 6,359,254 B1 | 3/2002 | Brown |
| 6,441,341 B1 | 8/2002 | Steibel et al. |
| 6,467,534 B1 | 10/2002 | Klug et al. |
| 6,474,348 B1 | 11/2002 | Beggs et al. |
| 6,505,678 B2 | 1/2003 | Mertins |
| 6,557,621 B1 | 5/2003 | Dierksmeier et al. |
| 6,578,623 B2 | 6/2003 | Keller et al. |
| 6,605,293 B1 | 8/2003 | Giordano et al. |
| 6,615,470 B2 | 9/2003 | Corderman et al. |
| 6,623,521 B2 | 9/2003 | Steinke et al. |
| 6,626,230 B1 | 9/2003 | Woodrum et al. |
| 6,634,858 B2 | 10/2003 | Roeloffs et al. |
| 6,637,500 B2 | 10/2003 | Shah et al. |
| 6,644,921 B2 | 11/2003 | Bunker et al. |
| 6,670,026 B2 | 12/2003 | Steibel et al. |
| 6,694,731 B2 | 2/2004 | Kamen et al. |
| 6,773,231 B2 | 8/2004 | Bunker et al. |
| 6,799,627 B2 | 10/2004 | Ray et al. |
| 6,800,234 B2 | 10/2004 | Ferguson et al. |
| 6,817,379 B2 | 11/2004 | Perla |
| 6,837,417 B2 | 1/2005 | Srinivasan |
| 6,896,036 B2 | 5/2005 | Schneiders et al. |
| 6,913,064 B2 | 7/2005 | Beals et al. |
| 6,929,054 B2 | 8/2005 | Beals et al. |
| 6,955,522 B2 | 10/2005 | Cunha et al. |
| 6,986,381 B2 | 1/2006 | Ray et al. |
| 7,028,747 B2 | 4/2006 | Widrig et al. |
| 7,036,556 B2 | 5/2006 | Caputo et al. |
| 7,052,710 B2 | 5/2006 | Giordano et al. |
| 7,073,561 B1 | 7/2006 | Henn |
| 7,093,645 B2 | 8/2006 | Grunstra et al. |
| 7,108,045 B2 | 9/2006 | Wiedemer et al. |
| 7,109,822 B2 | 9/2006 | Perkins et al. |
| 7,174,945 B2 | 2/2007 | Beals et al. |
| 7,185,695 B1 | 3/2007 | Santeler |
| 7,207,375 B2 | 4/2007 | Turkington et al. |
| 7,234,506 B2 | 6/2007 | Grunstra et al. |
| 7,237,375 B2 | 7/2007 | Humcke et al. |
| 7,237,595 B2 | 7/2007 | Beck et al. |
| 7,240,718 B2 | 7/2007 | Schmidt et al. |
| 7,243,700 B2 | 7/2007 | Beals et al. |
| 7,246,652 B2 | 7/2007 | Fowler |
| 7,270,170 B2 | 9/2007 | Beals et al. |
| 7,270,173 B2 | 9/2007 | Wiedemer et al. |
| 7,278,460 B2 | 10/2007 | Grunstra et al. |
| 7,278,463 B2 | 10/2007 | Snyder et al. |
| 7,306,026 B2 | 12/2007 | Memmen |
| 7,322,795 B2 | 1/2008 | Luczak et al. |
| 7,325,587 B2 | 2/2008 | Memmen |
| 7,334,625 B2 | 2/2008 | Judge et al. |
| 7,343,730 B2 | 3/2008 | Humcke et al. |
| 7,371,043 B2 | 5/2008 | Keller |
| 7,371,049 B2 | 5/2008 | Cunha et al. |
| 7,377,746 B2 | 5/2008 | Brassfield et al. |
| 7,410,342 B2 | 8/2008 | Matheny |
| 7,438,118 B2 | 10/2008 | Santeler |
| 7,448,433 B2 | 11/2008 | Ortiz et al. |
| 7,448,434 B2 | 11/2008 | Turkington et al. |
| 7,461,684 B2 | 12/2008 | Liu et al. |
| 7,478,994 B2 | 1/2009 | Cunha et al. |
| 7,517,225 B2 | 4/2009 | Cherian |
| 7,575,039 B2 | 8/2009 | Beals et al. |
| 7,588,069 B2 | 9/2009 | Munz et al. |
| 7,624,787 B2 | 12/2009 | Lee et al. |
| 7,625,172 B2 | 12/2009 | Walz et al. |
| 7,673,669 B2 | 3/2010 | Snyder et al. |
| 7,686,065 B2 | 3/2010 | Luczak |

(56) References Cited

U.S. PATENT DOCUMENTS

| | | |
|---|---|---|
| 7,713,029 B1 | 5/2010 | Davies |
| 7,717,676 B2 | 5/2010 | Cunha et al. |
| 7,722,327 B1 | 5/2010 | Liang |
| 7,802,613 B2 | 5/2010 | Bullied et al. |
| 7,727,495 B2 | 6/2010 | Burd et al. |
| 7,731,481 B2 | 6/2010 | Cunha et al. |
| 7,753,104 B2 | 7/2010 | Luczak et al. |
| 7,757,745 B2 | 7/2010 | Luczak |
| 7,771,210 B2 | 8/2010 | Cherian |
| 7,779,892 B2 | 8/2010 | Luczak et al. |
| 7,789,626 B1 | 9/2010 | Liang |
| 7,798,201 B2 | 9/2010 | Bewlay et al. |
| 7,806,681 B2 | 10/2010 | Feick et al. |
| 7,861,766 B2 | 1/2011 | Bochiechio et al. |
| 7,882,884 B2 | 2/2011 | Beals et al. |
| 7,938,168 B2 | 5/2011 | Lee et al. |
| 7,947,233 B2 | 5/2011 | Burd et al. |
| 7,963,085 B2 | 6/2011 | Sypeck et al. |
| 7,993,106 B2 | 8/2011 | Walters |
| 8,057,183 B1 | 11/2011 | Liang |
| 8,066,483 B1 | 11/2011 | Liang |
| 8,100,165 B2 | 1/2012 | Piggush et al. |
| 8,113,780 B2 | 2/2012 | Cherolis et al. |
| 8,122,583 B2 | 2/2012 | Luczak et al. |
| 8,137,068 B2 | 3/2012 | Surace et al. |
| 8,162,609 B1 | 4/2012 | Liang |
| 8,167,537 B1 | 5/2012 | Plank et al. |
| 8,171,978 B2 | 5/2012 | Propheter-Hinckley et al. |
| 8,181,692 B2 | 5/2012 | Frasier et al. |
| 8,196,640 B1 | 6/2012 | Paulus et al. |
| 8,251,123 B2 | 8/2012 | Farris et al. |
| 8,251,660 B1 | 8/2012 | Liang |
| 8,261,810 B1 | 9/2012 | Liang |
| 8,291,963 B1 | 10/2012 | Trinks et al. |
| 8,297,455 B2 | 10/2012 | Smyth |
| 8,302,668 B1 | 11/2012 | Bullied et al. |
| 8,303,253 B1 | 11/2012 | Liang |
| 8,307,654 B1 | 11/2012 | Liang |
| 8,317,475 B1 | 11/2012 | Downs |
| 8,322,988 B1 | 12/2012 | Downs et al. |
| 8,336,606 B2 | 12/2012 | Piggush |
| 8,342,802 B1 | 1/2013 | Liang |
| 8,366,394 B1 | 2/2013 | Liang |
| 8,381,923 B2 | 2/2013 | Smyth |
| 8,414,263 B1 | 4/2013 | Liang |
| 8,500,401 B1 | 8/2013 | Liang |
| 8,506,256 B1 | 8/2013 | Brostmeyer et al. |
| 8,535,004 B2 | 9/2013 | Campbell |
| 8,622,113 B1 | 1/2014 | Rau, III |
| 8,678,766 B1 | 3/2014 | Liang |
| 8,734,108 B1 | 5/2014 | Liang |
| 8,753,083 B2 | 6/2014 | Lacy et al. |
| 8,770,931 B2 | 7/2014 | Alvanos et al. |
| 8,777,571 B1 | 7/2014 | Liang |
| 8,793,871 B2 | 8/2014 | Morrison et al. |
| 8,794,298 B2 | 8/2014 | Schlienger et al. |
| 8,807,943 B1 | 8/2014 | Liang |
| 8,813,812 B2 | 8/2014 | Ellgass et al. |
| 8,813,824 B2 | 8/2014 | Appleby et al. |
| 8,858,176 B1 | 10/2014 | Liang |
| 8,864,469 B1 | 10/2014 | Liang |
| 8,870,524 B1 | 10/2014 | Liang |
| 8,876,475 B1 | 11/2014 | Liang |
| 8,893,767 B2 | 11/2014 | Mueller et al. |
| 8,899,303 B2 | 12/2014 | Mueller et al. |
| 8,906,170 B2 | 12/2014 | Gigliotti, Jr. et al. |
| 8,911,208 B2 | 12/2014 | Propheter-Hinckley et al. |
| 8,915,289 B2 | 12/2014 | Mueller et al. |
| 8,936,068 B2 | 1/2015 | Lee et al. |
| 8,940,114 B2 | 1/2015 | James et al. |
| 8,969,760 B2 | 3/2015 | Hu et al. |
| 8,978,385 B2 | 3/2015 | Cunha |
| 8,993,923 B2 | 3/2015 | Hu et al. |
| 8,997,836 B2 | 4/2015 | Mueller et al. |
| 9,038,706 B2 | 5/2015 | Hillier |
| 9,051,838 B2 | 6/2015 | Wardle et al. |
| 9,057,277 B2 | 6/2015 | Appleby et al. |
| 9,057,523 B2 | 6/2015 | Cunha et al. |
| 9,061,350 B2 | 6/2015 | Bewlay et al. |
| 9,079,241 B2 | 7/2015 | Barber et al. |
| 9,079,803 B2 | 7/2015 | Xu |
| 9,174,271 B2 | 11/2015 | Newton et al. |
| 2001/0044651 A1 | 11/2001 | Steinke et al. |
| 2002/0029567 A1 | 3/2002 | Kamen et al. |
| 2002/0182056 A1 | 12/2002 | Widrig et al. |
| 2002/0187065 A1 | 12/2002 | Amaya et al. |
| 2002/0190039 A1 | 12/2002 | Steibel et al. |
| 2002/0197161 A1 | 12/2002 | Roeloffs et al. |
| 2003/0047197 A1 | 3/2003 | Beggs et al. |
| 2003/0062088 A1 | 4/2003 | Perla |
| 2003/0133799 A1 | 7/2003 | Widrig et al. |
| 2003/0150092 A1 | 8/2003 | Corderman et al. |
| 2003/0199969 A1 | 10/2003 | Steinke et al. |
| 2003/0201087 A1 | 10/2003 | Devine et al. |
| 2004/0024470 A1 | 2/2004 | Giordano et al. |
| 2004/0055725 A1 | 3/2004 | Ray et al. |
| 2004/0056079 A1 | 3/2004 | Srinivasan |
| 2004/0144089 A1 | 7/2004 | Kamen et al. |
| 2004/0154252 A1 | 8/2004 | Sypeck et al. |
| 2004/0159985 A1 | 8/2004 | Altoonian et al. |
| 2005/0006047 A1 | 1/2005 | Wang et al. |
| 2005/0016706 A1 | 1/2005 | Ray et al. |
| 2005/0087319 A1 | 4/2005 | Beals et al. |
| 2005/0133193 A1 | 6/2005 | Beals et al. |
| 2005/0247429 A1 | 11/2005 | Turkington et al. |
| 2006/0032604 A1 | 2/2006 | Beck et al. |
| 2006/0048553 A1 | 3/2006 | Almquist |
| 2006/0065383 A1 | 3/2006 | Ortiz et al. |
| 2006/0107668 A1 | 5/2006 | Cunha et al. |
| 2006/0118262 A1 | 6/2006 | Beals et al. |
| 2006/0118990 A1 | 6/2006 | Dierkes et al. |
| 2006/0237163 A1 | 10/2006 | Turkington et al. |
| 2006/0283168 A1 | 12/2006 | Humcke et al. |
| 2007/0044936 A1 | 3/2007 | Memmen |
| 2007/0059171 A1 | 3/2007 | Simms et al. |
| 2007/0107412 A1 | 5/2007 | Humcke et al. |
| 2007/0114001 A1 | 5/2007 | Snyder et al. |
| 2007/0116972 A1 | 5/2007 | Persky |
| 2007/0169605 A1 | 7/2007 | Szymanski |
| 2007/0177975 A1 | 8/2007 | Luczak et al. |
| 2007/0253816 A1 | 11/2007 | Walz et al. |
| 2008/0003849 A1 | 1/2008 | Cherian |
| 2008/0080979 A1 | 4/2008 | Brassfield et al. |
| 2008/0131285 A1 | 6/2008 | Albert et al. |
| 2008/0135718 A1 | 6/2008 | Lee et al. |
| 2008/0138208 A1 | 6/2008 | Walters |
| 2008/0138209 A1 | 6/2008 | Cunha et al. |
| 2008/0145235 A1 | 6/2008 | Cunha et al. |
| 2008/0169412 A1 | 7/2008 | Snyder et al. |
| 2008/0190582 A1 | 8/2008 | Lee et al. |
| 2009/0041587 A1 | 2/2009 | Konter et al. |
| 2009/0095435 A1 | 4/2009 | Luczak et al. |
| 2009/0181560 A1 | 7/2009 | Cherian |
| 2009/0255742 A1 | 10/2009 | Hansen |
| 2010/0021643 A1 | 1/2010 | Lane et al. |
| 2010/0150733 A1 | 6/2010 | Abdel-Messeh et al. |
| 2010/0200189 A1 | 8/2010 | Qi et al. |
| 2010/0219325 A1 | 9/2010 | Bullied et al. |
| 2010/0276103 A1 | 11/2010 | Bullied et al. |
| 2010/0304064 A1 | 12/2010 | Huttner |
| 2011/0048665 A1 | 3/2011 | Schlienger et al. |
| 2011/0068077 A1 | 3/2011 | Smyth |
| 2011/0132563 A1 | 6/2011 | Merrill et al. |
| 2011/0132564 A1 | 6/2011 | Merrill et al. |
| 2011/0135446 A1 | 6/2011 | Dube et al. |
| 2011/0146075 A1 | 6/2011 | Hazel et al. |
| 2011/0150666 A1 | 6/2011 | Hazel et al. |
| 2011/0189440 A1 | 8/2011 | Appleby et al. |
| 2011/0236221 A1 | 9/2011 | Campbell |
| 2011/0240245 A1 | 10/2011 | Schlienger et al. |
| 2011/0250078 A1 | 10/2011 | Bruce et al. |
| 2011/0250385 A1 | 10/2011 | Sypeck et al. |
| 2011/0293434 A1 | 12/2011 | Lee et al. |
| 2011/0315337 A1 | 12/2011 | Piggush |

(56) References Cited

U.S. PATENT DOCUMENTS

| | | |
|---|---|---|
| 2012/0161498 A1 | 6/2012 | Hansen |
| 2012/0163995 A1 | 6/2012 | Wardle et al. |
| 2012/0168108 A1 | 7/2012 | Farris et al. |
| 2012/0183412 A1 | 7/2012 | Lacy et al. |
| 2012/0186681 A1 | 7/2012 | Sun et al. |
| 2012/0186768 A1 | 7/2012 | Sun et al. |
| 2012/0193841 A1 | 8/2012 | Wang et al. |
| 2012/0237786 A1 | 9/2012 | Morrison et al. |
| 2012/0276361 A1 | 11/2012 | James et al. |
| 2012/0298321 A1 | 11/2012 | Smyth |
| 2013/0019604 A1 | 1/2013 | Cunha et al. |
| 2013/0025287 A1 | 1/2013 | Cunha |
| 2013/0025288 A1 | 1/2013 | Cunha et al. |
| 2013/0064676 A1 | 3/2013 | Salisbury et al. |
| 2013/0139990 A1 | 6/2013 | Appleby et al. |
| 2013/0177448 A1 | 7/2013 | Spangler |
| 2013/0220571 A1 | 8/2013 | Mueller et al. |
| 2013/0266816 A1 | 10/2013 | Xu |
| 2013/0280093 A1 | 10/2013 | Zelesky et al. |
| 2013/0318771 A1 | 12/2013 | Luczak et al. |
| 2013/0323033 A1 | 12/2013 | Lutjen et al. |
| 2013/0327602 A1 | 12/2013 | Barber et al. |
| 2013/0333855 A1 | 12/2013 | Merrill et al. |
| 2013/0338267 A1 | 12/2013 | Appleby et al. |
| 2014/0023497 A1 | 1/2014 | Giglio et al. |
| 2014/0031458 A1 | 1/2014 | Jansen |
| 2014/0033736 A1 | 2/2014 | Propheter-Hinckley et al. |
| 2014/0068939 A1 | 3/2014 | Devine, II et al. |
| 2014/0076857 A1 | 3/2014 | Hu et al. |
| 2014/0076868 A1 | 3/2014 | Hu et al. |
| 2014/0093387 A1 | 4/2014 | Pointon et al. |
| 2014/0140860 A1 | 5/2014 | Tibbott et al. |
| 2014/0169981 A1 | 6/2014 | Bales et al. |
| 2014/0199177 A1 | 7/2014 | Propheter-Hinckley et al. |
| 2014/0202650 A1 | 7/2014 | Song et al. |
| 2014/0284016 A1 | 9/2014 | Vander Wal |
| 2014/0311315 A1 | 10/2014 | Isaac |
| 2014/0314581 A1 | 10/2014 | McBrien et al. |
| 2014/0342175 A1 | 11/2014 | Morrison et al. |
| 2014/0342176 A1 | 11/2014 | Appleby et al. |
| 2014/0356560 A1 | 12/2014 | Prete et al. |
| 2014/0363305 A1 | 12/2014 | Shah et al. |
| 2015/0053365 A1 | 2/2015 | Mueller et al. |
| 2015/0174653 A1 | 6/2015 | Verner et al. |
| 2015/0184857 A1 | 7/2015 | Cunha et al. |
| 2015/0306657 A1 | 10/2015 | Frank |

FOREIGN PATENT DOCUMENTS

| | | |
|---|---|---|
| EP | 0025481 B1 | 2/1983 |
| EP | 0111600 A1 | 6/1984 |
| EP | 0190114 A1 | 8/1986 |
| EP | 0319244 A2 | 6/1989 |
| EP | 0324229 A2 | 7/1989 |
| EP | 0324229 B1 | 7/1992 |
| EP | 0539317 A1 | 4/1993 |
| EP | 0556946 A1 | 8/1993 |
| EP | 0559251 A1 | 9/1993 |
| EP | 0585183 A1 | 3/1994 |
| EP | 0319244 B1 | 5/1994 |
| EP | 0661246 A1 | 7/1995 |
| EP | 0539317 B1 | 11/1995 |
| EP | 0715913 A1 | 6/1996 |
| EP | 0725606 A1 | 8/1996 |
| EP | 0750956 A2 | 1/1997 |
| EP | 0750957 A1 | 1/1997 |
| EP | 0792409 A1 | 9/1997 |
| EP | 0691894 B1 | 10/1997 |
| EP | 0805729 A2 | 11/1997 |
| EP | 0818256 A1 | 1/1998 |
| EP | 0556946 B1 | 4/1998 |
| EP | 0559251 B1 | 12/1998 |
| EP | 0585183 B1 | 3/1999 |
| EP | 0899039 A2 | 3/1999 |
| EP | 0750956 B1 | 5/1999 |
| EP | 0661246 B1 | 9/1999 |
| EP | 0725606 B1 | 12/1999 |
| EP | 0968062 A1 | 1/2000 |
| EP | 0805729 B1 | 8/2000 |
| EP | 1055800 A2 | 11/2000 |
| EP | 1070829 A2 | 1/2001 |
| EP | 1124509 A1 | 8/2001 |
| EP | 1142658 A1 | 10/2001 |
| EP | 1161307 A1 | 12/2001 |
| EP | 1163970 A1 | 12/2001 |
| EP | 1178769 A1 | 2/2002 |
| EP | 0715913 B1 | 4/2002 |
| EP | 0968062 B1 | 5/2002 |
| EP | 0951579 B1 | 1/2003 |
| EP | 1284338 A2 | 2/2003 |
| EP | 0750957 B1 | 3/2003 |
| EP | 1341481 A2 | 9/2003 |
| EP | 1358958 A1 | 11/2003 |
| EP | 1367224 A1 | 12/2003 |
| EP | 0818256 B1 | 2/2004 |
| EP | 1124509 B1 | 3/2004 |
| EP | 1425483 A2 | 6/2004 |
| EP | 1055800 B1 | 10/2004 |
| EP | 1163970 B1 | 3/2005 |
| EP | 1358958 B1 | 3/2005 |
| EP | 1519116 A1 | 3/2005 |
| EP | 1531019 A1 | 5/2005 |
| EP | 0899039 B1 | 11/2005 |
| EP | 1604753 A1 | 12/2005 |
| EP | 1659264 A2 | 5/2006 |
| EP | 1178769 B1 | 7/2006 |
| EP | 1382403 B1 | 9/2006 |
| EP | 1759788 A2 | 3/2007 |
| EP | 1764171 A1 | 3/2007 |
| EP | 1813775 A2 | 8/2007 |
| EP | 1815923 A1 | 8/2007 |
| EP | 1849965 A2 | 10/2007 |
| EP | 1070829 B1 | 1/2008 |
| EP | 1142658 B1 | 3/2008 |
| EP | 1927414 A2 | 6/2008 |
| EP | 1930097 A1 | 6/2008 |
| EP | 1930098 A1 | 6/2008 |
| EP | 1930099 A1 | 6/2008 |
| EP | 1932604 A1 | 6/2008 |
| EP | 1936118 A2 | 6/2008 |
| EP | 1939400 A2 | 7/2008 |
| EP | 1984162 A1 | 10/2008 |
| EP | 1604753 B1 | 11/2008 |
| EP | 2000234 A2 | 12/2008 |
| EP | 2025869 A1 | 2/2009 |
| EP | 1531019 B1 | 3/2010 |
| EP | 2212040 A1 | 8/2010 |
| EP | 2246133 A1 | 11/2010 |
| EP | 2025869 B1 | 12/2010 |
| EP | 2335845 A1 | 6/2011 |
| EP | 2336493 A2 | 6/2011 |
| EP | 2336494 A2 | 6/2011 |
| EP | 1930097 B1 | 7/2011 |
| EP | 2362822 A2 | 9/2011 |
| EP | 2366476 A1 | 9/2011 |
| EP | 2392774 A1 | 12/2011 |
| EP | 1930098 B1 | 2/2012 |
| EP | 2445668 A2 | 5/2012 |
| EP | 2445669 A2 | 5/2012 |
| EP | 2461922 A1 | 6/2012 |
| EP | 1659264 B1 | 11/2012 |
| EP | 2519367 A2 | 11/2012 |
| EP | 2537606 A1 | 12/2012 |
| EP | 1927414 B1 | 1/2013 |
| EP | 2549186 A2 | 1/2013 |
| EP | 2551592 A2 | 1/2013 |
| EP | 2551593 A2 | 1/2013 |
| EP | 2559533 A2 | 2/2013 |
| EP | 2559534 A2 | 2/2013 |
| EP | 2559535 A2 | 2/2013 |
| EP | 2576099 A1 | 4/2013 |
| EP | 2000234 B1 | 7/2013 |
| EP | 2614902 A2 | 7/2013 |
| EP | 2650062 A2 | 10/2013 |

(56) References Cited

FOREIGN PATENT DOCUMENTS

| | | | |
|---|---|---|---|
| EP | 2246133 B1 | 7/2014 | |
| EP | 2366476 B1 | 7/2014 | |
| EP | 2777841 A1 | 9/2014 | |
| EP | 1849965 B1 | 2/2015 | |
| EP | 2834031 A2 | 2/2015 | |
| EP | 1341481 B1 | 3/2015 | |
| EP | 2841710 A1 | 3/2015 | |
| EP | 2855857 A2 | 4/2015 | |
| EP | 2880276 A1 | 6/2015 | |
| EP | 2937161 A1 | 10/2015 | |
| GB | 731292 A | 6/1955 | |
| GB | 800228 A | 8/1958 | |
| GB | 2102317 A | 2/1983 | |
| GB | 2118078 A | 10/1983 | |
| JP | 5-330957 A * | 12/1993 | ............... B22C 9/10 |
| JP | H1052731 A | 2/1998 | |
| WO | 9615866 A1 | 5/1996 | |
| WO | 9618022 A1 | 6/1996 | |
| WO | 2010036801 A2 | 4/2010 | |
| WO | 2010040746 A1 | 4/2010 | |
| WO | 2010151833 A2 | 12/2010 | |
| WO | 2010151838 A2 | 12/2010 | |
| WO | 2011019667 A1 | 2/2011 | |
| WO | 2013163020 A1 | 10/2013 | |
| WO | 2014011262 A2 | 1/2014 | |
| WO | 2014022255 A1 | 2/2014 | |
| WO | 2014028095 A2 | 2/2014 | |
| WO | 2014093826 A2 | 6/2014 | |
| WO | 2014105108 A1 | 7/2014 | |
| WO | 2014109819 A1 | 7/2014 | |
| WO | 2014133635 A2 | 9/2014 | |
| WO | 2014179381 A1 | 11/2014 | |
| WO | 2015006026 A1 | 1/2015 | |
| WO | 2015006440 A1 | 1/2015 | |
| WO | 2015006479 A1 | 1/2015 | |
| WO | 2015009448 A1 | 1/2015 | |
| WO | 2015042089 A1 | 3/2015 | |
| WO | 2015050987 A1 | 4/2015 | |
| WO | 2015053833 A1 | 4/2015 | |
| WO | 2015073068 A1 | 5/2015 | |
| WO | 2015073657 A1 | 5/2015 | |
| WO | 2015080854 A1 | 6/2015 | |
| WO | 2015094636 A1 | 6/2015 | |

OTHER PUBLICATIONS

European Search Report and Opinion issued in connection with related EP Application No. 16202422.8 dated May 8, 2017.
European Search Report and Opinion issued in connection with related EP Application No. 16204602.3 dated May 12, 2017.
European Search Report and Opinion issued in connection with related EP Application No. 16204609.8 dated May 12, 2017.
European Search Report and Opinion issued in connection with related EP Application No. 16204610.6 dated May 17, 2017.
European Search Report and Opinion issued in connection with related EP Application No. 16204613.0 dated May 22, 2017.
European Search Report and Opinion issued in connection with related EP Application No. 16204605.6 dated May 26, 2017.
European Search Report and Opinion issued in connection with related EP Application No. 16204607.2 dated May 26, 2017.
European Search Report and Opinion issued in connection with related EP Application No. 16204608.0 dated May 26, 2017.
European Search Report and Opinion issued in connection with related EP Application No. 16204617.1 dated May 26, 2017.
European Search Report and Opinion issued in connection with corresponding EP Application No. 16204614.8.0 dated Jun. 2, 2017.
European Search Report and Opinion issued in connection with related EP Application No. 17168418.6 dated Aug. 10, 2017.
Liu et al, "Effect of nickel coating on bending properties of stereolithography photo-polymer SL5195", Materials & Design, vol. 26, Issue 6, pp. 493-496, 2005.

* cited by examiner

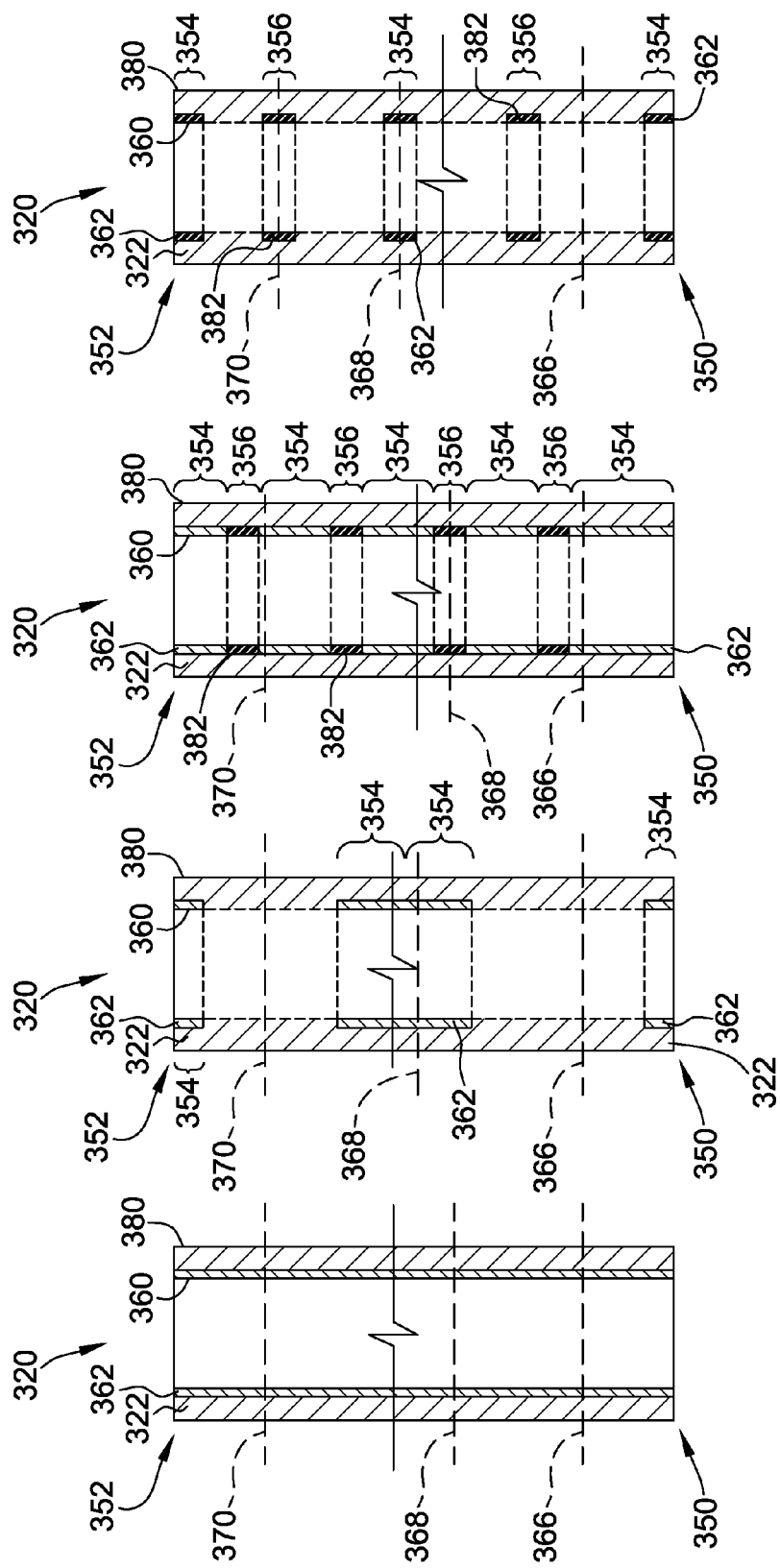

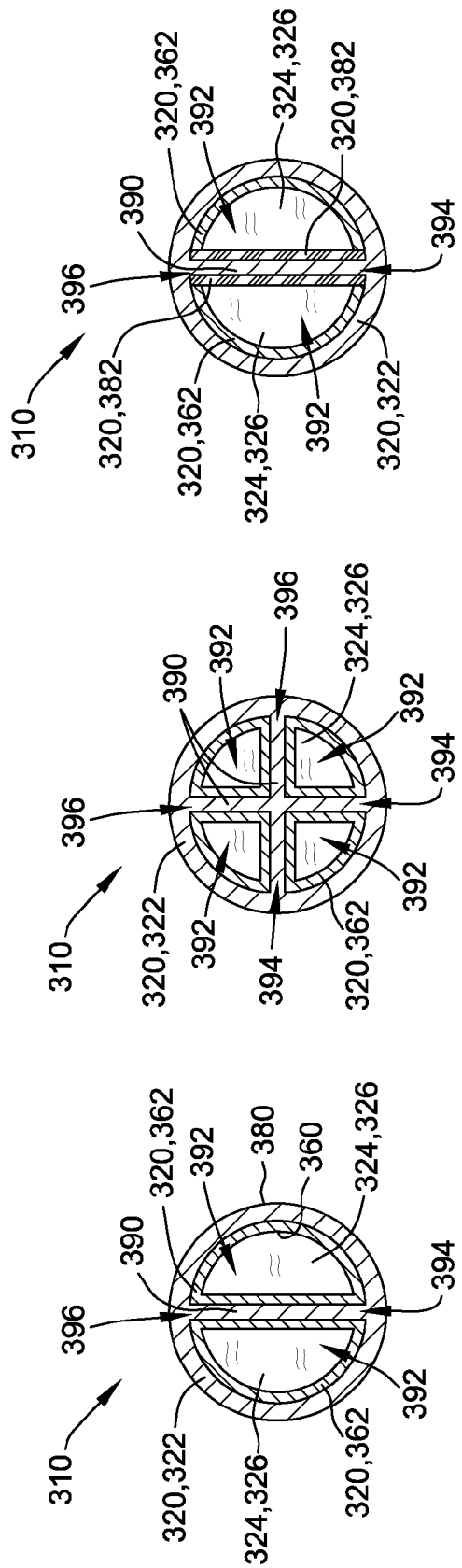

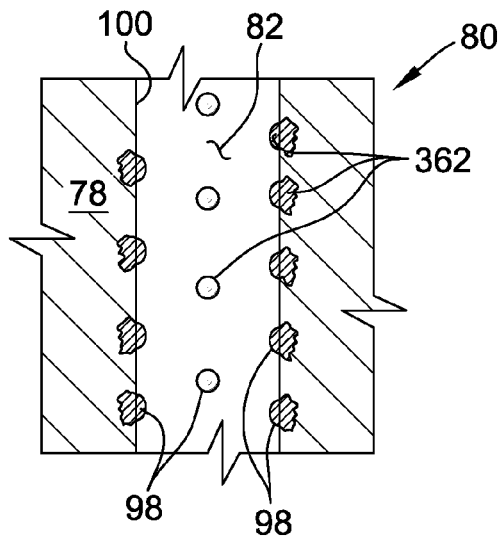
FIG. 14
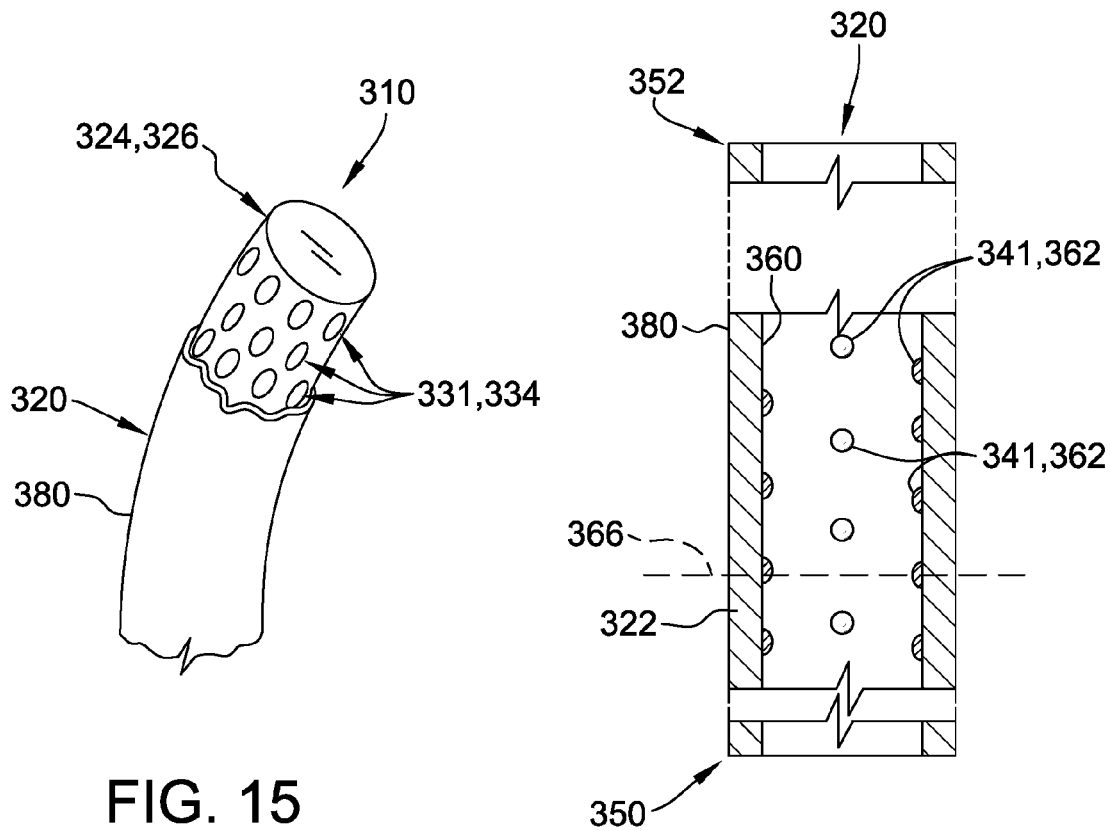
FIG. 15
FIG. 16

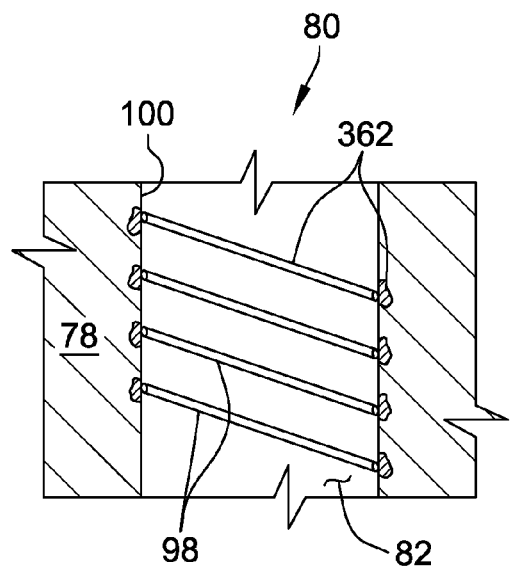
FIG. 17
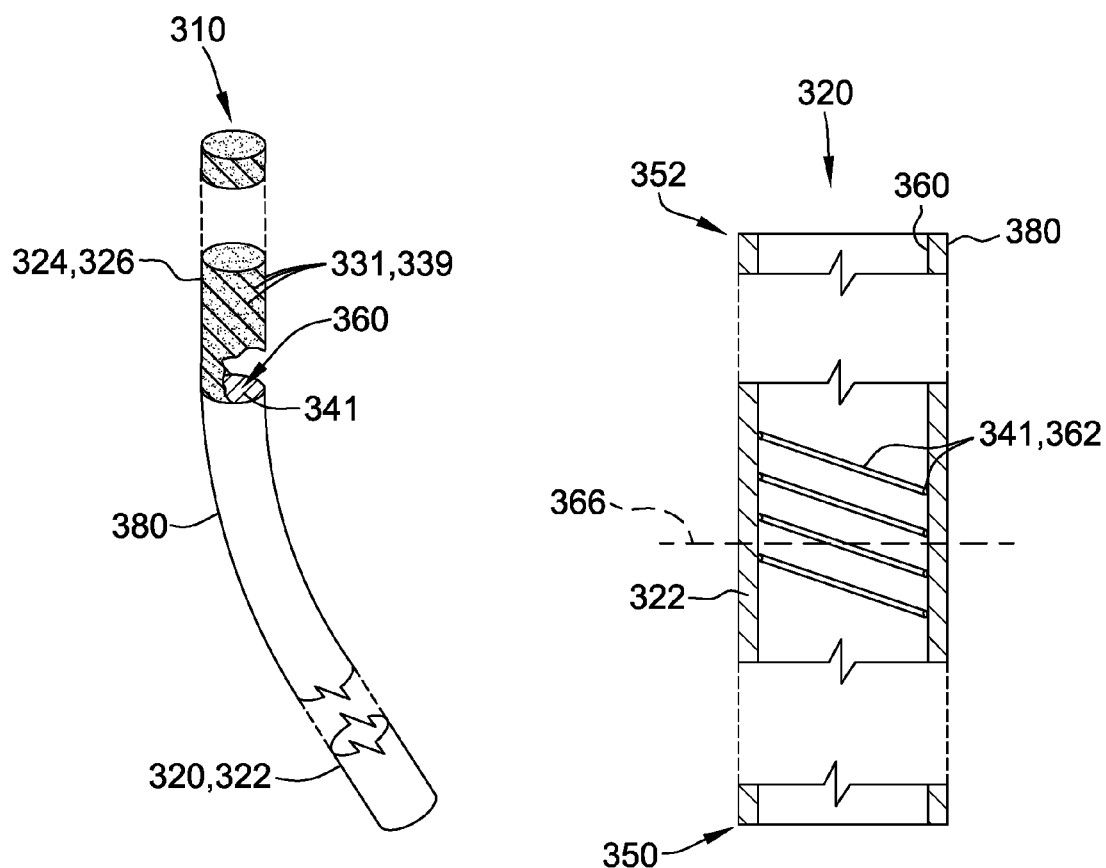
FIG. 18
FIG. 19

METHOD AND ASSEMBLY FOR FORMING COMPONENTS HAVING A CATALYZED INTERNAL PASSAGE DEFINED THEREIN

BACKGROUND

The field of the disclosure relates generally to components having an internal passage defined therein, and more particularly to forming such components having internal passages lined with a catalyst material.

Some components require an internal passage to be defined therein, for example, in order to carry a flow of fluid. For example, but not by way of limitation, some components, such as components of combustion systems, include internal fuel-flow passages. In addition, at least some components having an internal passage defined therein are used in systems which require the fluid carried in the internal passage to be subjected to a catalyzed reaction. For example, but not by way of limitation, at least some such systems include reformers that convert, for example, methane or other relatively heavier fuels into syngas. However, in at least some such systems, the catalyzed reaction is required to occur in a separate dedicated component, such as a catalyst bed, increasing a size, manufacturing cost, and operating cost of the system.

BRIEF DESCRIPTION

In one aspect, a method of forming a component having an internal passage defined therein is provided. The method includes positioning a jacketed core with respect to a mold. The jacketed core includes a hollow structure formed from at least a first material and a first catalyst, and an inner core disposed within the hollow structure. The method also includes introducing a component material in a molten state into a cavity of the mold, and cooling the component material in the cavity to form the component. The inner core defines the internal passage within the component.

In another aspect, a mold assembly for use in forming a component having an internal passage defined therein is provided. The mold assembly includes a mold defining a mold cavity therein, and a jacketed core positioned with respect to the mold. The jacketed core includes a hollow structure formed from at least a first material and a first catalyst, and an inner core disposed within the hollow structure. The inner core is positioned to define the internal passage within the component when a component material in a molten state is introduced into the mold cavity and cooled to form the component.

DRAWINGS

FIG. 7 is a schematic sectional view of an exemplary embodiment of a hollow structure for use in forming the jacketed core shown in FIG. 3;

FIG. 8 is a schematic sectional view of another exemplary embodiment of a hollow structure for use in forming the jacketed core shown in FIG. 3;

FIG. 9 is a schematic sectional view of another exemplary embodiment of a hollow structure for use in forming the jacketed core shown in FIG. 3;

FIG. 10 is a schematic sectional view of another exemplary embodiment of a hollow structure for use in forming the jacketed core shown in FIG. 3;

FIG. 11 is a schematic cross-section of another exemplary jacketed core for use with the mold assembly shown in FIG. 3, taken along lines 4-4 shown in FIG. 3;

FIG. 12 is a schematic cross-section of another exemplary jacketed core for use with the mold assembly shown in FIG. 3, taken along lines 4-4 shown in FIG. 3;

FIG. 13 is a schematic cross-section of another exemplary jacketed core for use with the mold assembly shown in FIG. 3, taken along lines 4-4 shown in FIG. 3;

FIG. 14 is a schematic sectional view of a portion of another exemplary component for use with the rotary machine shown in FIG. 1;

FIG. 15 is a schematic perspective cutaway view of another exemplary jacketed core for use with the mold assembly shown in FIG. 3 to form the component shown in FIG. 14;

FIG. 16 is a schematic sectional view of an exemplary embodiment of a hollow structure for use in forming the jacketed core shown in FIG. 15;

FIG. 17 is a schematic sectional view of a portion of another exemplary component for use with the rotary machine shown in FIG. 1;

FIG. 18 is a schematic perspective cutaway view of another exemplary jacketed core for use with the mold assembly shown in FIG. 3 to form the component shown in FIG. 17;

FIG. 19 is a schematic sectional view of an exemplary embodiment of a hollow structure for use in forming the jacketed core shown in FIG. 18;

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming systems that include a component having an internal passage defined therein, and require a catalyzed reaction to be performed on a fluid carried in the internal passage. The embodiments described herein provide a jacketed core positioned with respect to a mold. The jacketed core includes a hollow structure and an inner core disposed within the hollow structure. The inner core extends within the mold cavity to define a position of the internal passage within the component to be formed in the mold. The hollow structure is formed from a first material and a first catalyst. The first catalyst is strategically distributed within the hollow structure, such as by an additive manufacturing process, such that the first catalyst is selectively positioned along the internal passage when the component is formed in the mold.

Figure 1:
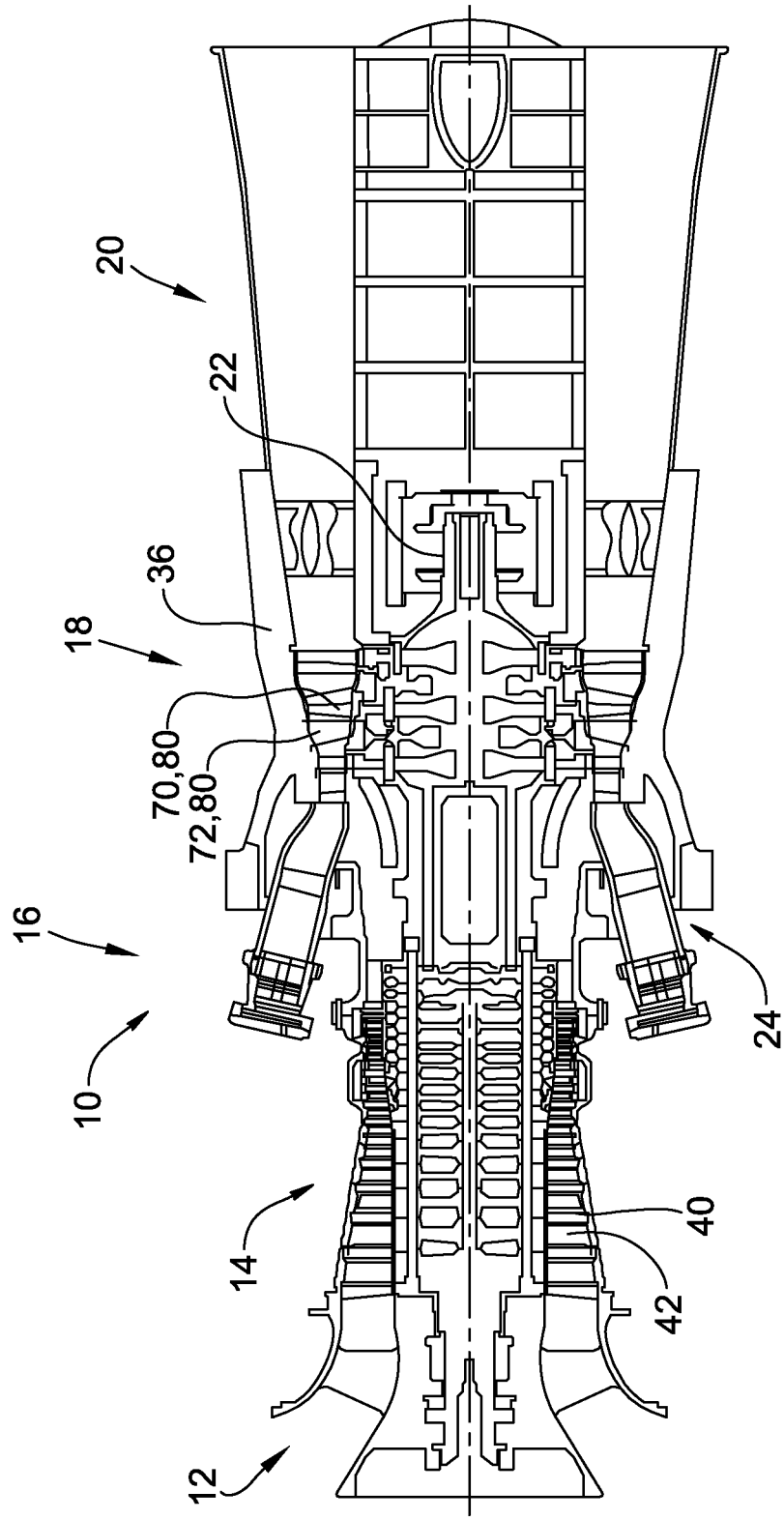
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component suitably formed with an internal passage defined therein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed with an internal passage defined therein.

Figure 2:
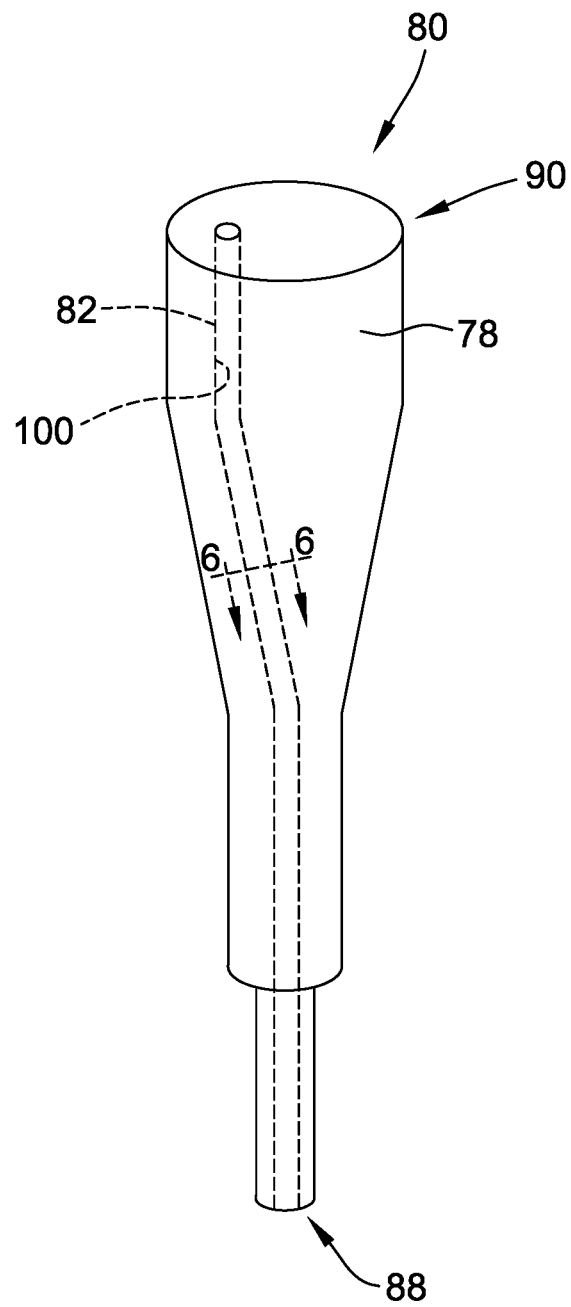
FIG. 2 is a schematic perspective view of an exemplary component for use with the rotary machine shown in FIG. 1.

FIG. 2 is a schematic perspective view of an exemplary component 80, illustrated for use with rotary machine 10 (shown in FIG. 1). Component 80 includes at least one internal passage 82 defined therein by an interior wall 100. Although only one internal passage 82 is illustrated, it should be understood that component 80 includes any suitable number of internal passages 82 formed as described herein.

Component 80 is formed from a component material 78. In the exemplary embodiment, component material 78 is a suitable metallic alloy. In alternative embodiments, component material 78 is any suitable material that enables component 80 to be formed as described herein.

In the exemplary embodiment, component 80 is a component of combustor section 16, and internal passage 82 flows a fluid within combustor section 16 during operation of rotary machine 10 (shown in FIG. 1). In alternative embodiments, component 80 is another suitable component of rotary machine 10 that is capable of being formed with an internal passage as described herein. In still other embodiments, component 80 is any component for any suitable application that is suitably formed with an internal passage defined therein.

In the exemplary embodiment, component 80 extends generally longitudinally from a first end 88 to an opposite second end 90. In alternative embodiments, component 80 has any suitable configuration that is capable of being formed with an internal passage as described herein. In the exemplary embodiment, internal passage 82 extends from first end 88 to second end 90. In alternative embodiments, internal passage 82 extends within component 80 in any suitable fashion, and to any suitable extent, that enables internal passage 82 to be formed as described herein. In certain embodiments, internal passage 82 is nonlinear. For example, internal passage 82 has a nonlinear shape that is complementary to a contour of component 80. In alternative embodiments, internal passage 82 is nonlinear and other than complementary to a contour of component 80. In other alternative embodiments, internal passage 82 extends linearly.

In some embodiments, internal passage 82 has a substantially circular cross-sectional perimeter. In alternative embodiments, internal passage 82 has a substantially ovoid cross-sectional perimeter. In other alternative embodiments, internal passage 82 has any suitably shaped cross-sectional perimeter that enables internal passage 82 to be formed as described herein. Moreover, in certain embodiments, a shape of the cross-sectional perimeter of internal passage 82 is substantially constant along a length of internal passage 82. In alternative embodiments, the shape of the cross-sectional perimeter of internal passage 82 varies along a length of internal passage 82 in any suitable fashion that enables internal passage 82 to be formed as described herein.

In certain embodiments, internal passage 82 defines a relatively high length-to-diameter ratio. For example, in some embodiments, internal passage 82 defines a length-to-diameter ratio of at least about 25. For another example, in some embodiments, internal passage 82 defines a length-to-diameter ratio of at least about 60. For another example, in some embodiments, internal passage 82 defines a length-to-diameter ratio of at least about 70. For another example, in some embodiments, internal passage 82 defines a length-to-diameter ratio of at least about 80. In alternative embodiments, internal passage 82 defines any suitable length-to-diameter ratio, including a length-to-diameter ratio of less than about 25.

Figure 3:
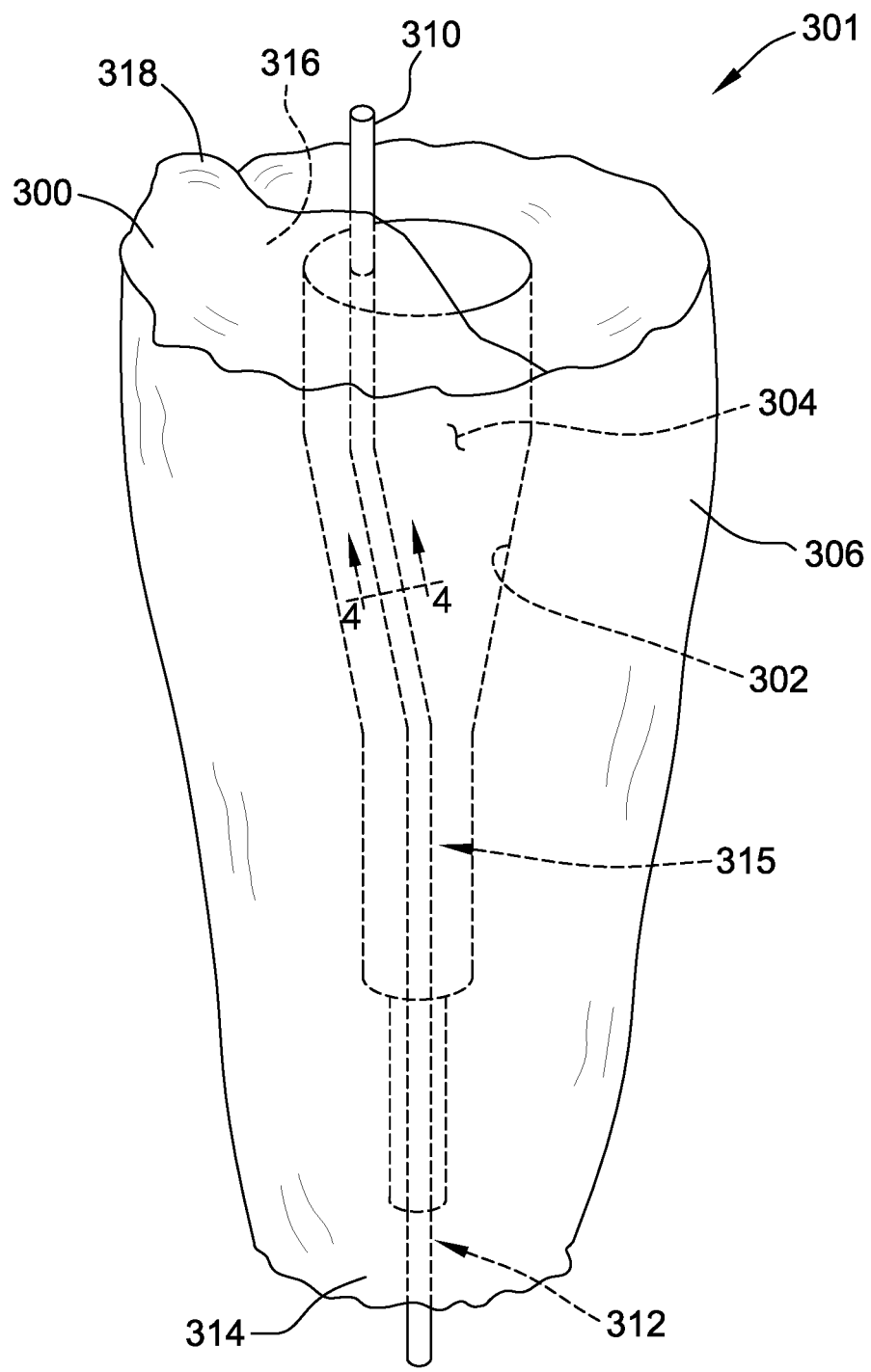
FIG. 3 is a schematic perspective view of an exemplary mold assembly for making the component shown in FIG. 2, the mold assembly including a jacketed core positioned with respect to a mold.
Figure 4:
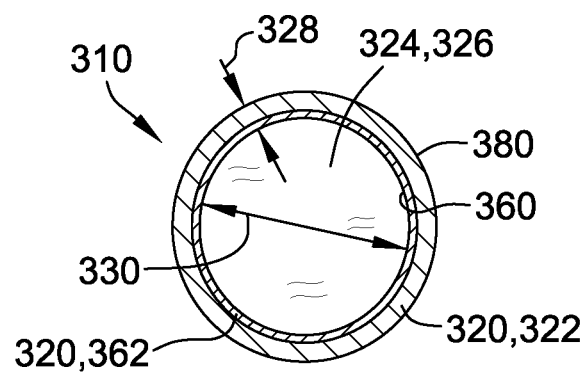
FIG. 4 is a schematic cross-section of an exemplary jacketed core for use with the mold assembly shown in FIG. 3, taken along lines 4-4 shown in FIG. 3.

FIG. 3 is a schematic perspective view of a mold assembly 301 for making component 80 (shown in FIG. 2). Mold assembly 301 includes a jacketed core 310 positioned with respect to a mold 300. FIG. 4 is a schematic cross-section of an embodiment of jacketed core 310 taken along lines 4-4 shown in FIG. 3. With reference to FIGS. 2-4, an interior wall 302 of mold 300 defines a mold cavity 304. Interior wall 302 defines a shape corresponding to an exterior shape of component 80, such that component material 78 in a molten state can be introduced into mold cavity 304 and cooled to form component 80. It should be recalled that, although component 80 in the exemplary embodiment is a component of rotary machine 10, in alternative embodiments component 80 is any component suitably formable with an internal passage defined therein, as described herein.

Jacketed core 310 is positioned with respect to mold 300 such that a portion 315 of jacketed core 310 extends within mold cavity 304. Jacketed core 310 includes a hollow structure 320 formed from a first material 322 and a first catalyst 362. Jacketed core 310 also includes an inner core 324 disposed within hollow structure 320 and formed from an inner core material 326. Inner core 324 is shaped to define a shape of internal passage 82, and inner core 324 of portion 315 of jacketed core 310 positioned within mold cavity 304 defines internal passage 82 within component 80 when component 80 is formed.

Hollow structure 320 includes an outer wall 380 that substantially encloses inner core 324 along a length of inner core 324. An interior portion 360 of hollow structure 320 is located interiorly with respect to outer wall 380, such that inner core 324 is complementarily shaped by interior portion 360 of hollow structure 320. In certain embodiments, hollow structure 320 defines a generally tubular shape. For example, but not by way of limitation, hollow structure 320 is initially formed from a substantially straight metal tube that is suitably manipulated into a nonlinear shape, such as a curved or angled shape, as necessary to define a selected nonlinear shape of inner core 324 and, thus, of internal passage 82. In alternative embodiments, hollow structure 320 defines any suitable shape that enables inner core 324 to define a shape of internal passage 82 as described herein.

In the exemplary embodiment, hollow structure 320 has a wall thickness 328 that is less than a characteristic width 330 of inner core 324. Characteristic width 330 is defined herein as the diameter of a circle having the same cross-sectional area as inner core 324. In alternative embodiments, hollow structure 320 has a wall thickness 328 that is other than less than characteristic width 330. A shape of a cross-section of inner core 324 is circular in the exemplary embodiment. Alternatively, the shape of the cross-section of inner core 324 corresponds to any suitable shape of the cross-section of internal passage 82 that enables internal passage 82 to function as described herein.

In certain embodiments, first material 322 is selected to provide structural support to jacketed core 310. In alternative embodiments, first material 322 is selected to be any suitable material that enables hollow structure 320 to function as described herein. In other alternative embodiments, hollow structure 320 does not include first material 322. For example, but not by way of limitation, first catalyst 362 is sufficient to provide structural support to jacketed core 310.

In the exemplary embodiment, hollow structure 320 includes first catalyst 362 disposed adjacent at least a portion of inner core 324, and first material 322 disposed adjacent outer wall 380. More specifically, first catalyst 362 defines interior portion 360 of hollow structure 320, and first material 322 defines outer wall 380 of hollow structure 320. In alternative embodiments, first material 322 and first catalyst 362 are disposed in any suitable arrangement within hollow structure 320 that enables hollow structure 320 to function as described herein. For example, hollow structure 320 does not include first material 322, such that first catalyst 362 extends from interior portion 360 to outer wall 380.

First catalyst 362 is selected to be catalytically active along internal passage 82 after component 80 is formed, as will be described herein. As one example, component 80 is a component of combustor section 16, and first catalyst 362 is selected to catalyze reformation, such as, but not limited to, steam reformation, preferential oxidation, and/or autothermal reformation, within internal passage 82. As another example, component 80 is a component of a hydrolysis system (not shown), and first catalyst 362 is a proton acid. As another example, component 80 is a component of a sulfur recovery system (not shown), and first catalyst 362 is alumina. As another example, component 80 is a component of a sulfuric acid manufacturing plant (not shown), and first catalyst 362 is vanadium oxide. As another example, component 80 is a component of any system implementing a chemical reaction, and first catalyst 362 is any suitable material that facilitates, but is not consumed by, the chemical reaction within internal passage 82. In addition, although first catalyst 362 is referred to as a single catalyst, it should be understood that, in some embodiments, first catalyst 362 includes a mixture of a plurality of catalytically active constituents.

Figure 5:
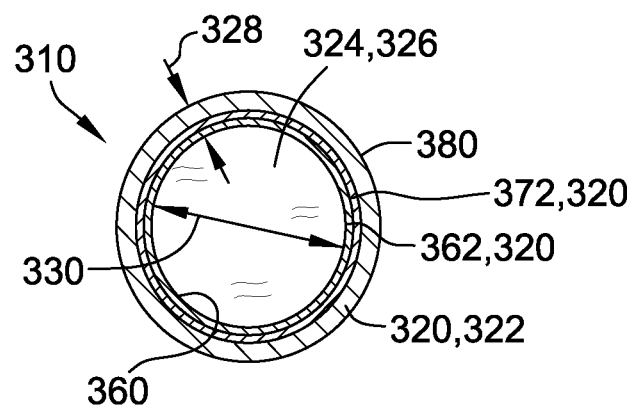
FIG. 5 is a schematic cross-section of another exemplary jacketed core for use with the mold assembly shown in FIG. 3, taken along lines 4-4 shown in FIG. 3.

In certain embodiments, hollow structure 320 is formed from any suitable number of materials in addition to first material 322 and first catalyst 362. For example, FIG. 5 is a schematic cross-section of another embodiment of jacketed core 310 taken along lines 4-4 shown in FIG. 3. In the exemplary embodiment, jacketed core 310 includes first catalyst 362 disposed adjacent at least a portion of inner core 324, first material 322 disposed adjacent outer wall 380, and a second material 372 disposed radially between first catalyst 362 and first material 322. In some embodiments, first catalyst 362 again is selected to facilitate a suitable chemical reaction within internal passage 82, and second material 372 is selected to be a promoter of a reaction catalyzed by first catalyst 362. For example, first catalyst 362 is selected as a nickel-based material to facilitate steam reformation within internal passage 82, and second material 372 is selected to be cerium. In alternative embodiments, second material 372 is a bond coat material that facilitates bonding of first catalyst 362 to at least one of first material 322 and component material 78. In other alternative embodiments, second material 372 is any suitable material that enables jacketed core 310 to function as described herein.

With reference to FIGS. 2-5, mold 300 is formed from a mold material 306. In the exemplary embodiment, mold material 306 is a refractory ceramic material selected to withstand a high temperature environment associated with the molten state of component material 78 used to form component 80. In alternative embodiments, mold material 306 is any suitable material that enables component 80 to be formed as described herein. Moreover, in the exemplary embodiment, mold 300 is formed by a suitable investment casting process. For example, but not by way of limitation, a suitable pattern material, such as wax, is injected into a suitable pattern die to form a pattern (not shown) of component 80, the pattern is repeatedly dipped into a slurry of mold material 306 which is allowed to harden to create a shell of mold material 306, and the shell is dewaxed and fired to form mold 300. In alternative embodiments, mold 300 is formed by any suitable method that enables mold 300 to function as described herein.

In certain embodiments, jacketed core 310 is secured relative to mold 300 such that jacketed core 310 remains fixed relative to mold 300 during a process of forming component 80. For example, jacketed core 310 is secured such that a position of jacketed core 310 does not shift during introduction of molten component material 78 into mold cavity 304 surrounding jacketed core 310. In some embodiments, jacketed core 310 is coupled directly to mold 300. For example, in the exemplary embodiment, a tip portion 312 of jacketed core 310 is rigidly encased in a tip portion 314 of mold 300. Additionally or alternatively, a root portion 316 of jacketed core 310 is rigidly encased in a root portion 318 of mold 300 opposite tip portion 314. For example, but not by way of limitation, mold 300 is formed by investment as described above, and jacketed core 310 is securely coupled to the suitable pattern die such that tip portion 312 and root portion 316 extend out of the pattern die, while portion 315 extends within a cavity of the die. The pattern material is injected into the die around jacketed core 310 such that portion 315 extends within the pattern. The investment causes mold 300 to encase tip portion 312 and/or root portion 316. Additionally or alternatively, jacketed core 310 is secured relative to mold 300 in any other suitable fashion that enables the position of jacketed core 310 relative to mold 300 to remain fixed during a process of forming component 80.

First material 322 is selected to be at least partially absorbable by molten component material 78. In certain embodiments, component material 78 is an alloy, and first material 322 is at least one constituent material of the alloy. For example, in the exemplary embodiment, component material 78 is a nickel-based superalloy, and first material 322 is substantially nickel, such that first material 322 is substantially absorbable by component material 78 when component material 78 in the molten state is introduced into mold cavity 304. In alternative embodiments, component material 78 is any suitable alloy, and first material 322 is at least one material that is at least partially absorbable by the molten alloy. For example, component material 78 is a cobalt-based superalloy, and first material 322 is substantially cobalt. For another example, component material 78 is an iron-based alloy, and first material 322 is substantially iron. For another example, component material 78 is a titanium-based alloy, and first material 322 is substantially titanium.

In certain embodiments, first catalyst 362 also is selected to be at least partially absorbable by molten component material 78, as described above with respect to first material 322. Moreover, in some embodiments in which hollow structure 320 includes materials in addition to first material 322 and first catalyst 362, the additional materials, such as, but not limited to, second material 372, also are selected to be at least partially absorbable by molten component material 78, as described above with respect to first material 322.

In certain embodiments, wall thickness 328 is sufficiently thin such that first material 322 and first catalyst 362 of portion 315 of jacketed core 310, that is, the portion that extends within mold cavity 304, are substantially absorbed by component material 78 when component material 78 in the molten state is introduced into mold cavity 304. In alternative embodiments, wall thickness 328 is selected such that at least one of first material 322 and first catalyst 362 are other than substantially absorbed by component material 78. For example, in some embodiments, after component material 78 is cooled, at least one of first material 322 and first catalyst 362 is other than substantially uniformly distributed within component material 78. In some such embodiments, at least one of first material 322 and first catalyst 362 are partially absorbed by component material 78 such that a discrete boundary delineates hollow structure 320 from component material 78 after component material 78 is cooled. Moreover, in some such embodiments, at least one of first material 322 and first catalyst 362 are partially absorbed by component material 78 such that at least a portion of hollow structure 320 proximate inner core 324 remains intact after component material 78 is cooled.

In some such embodiments, after component 80 is formed, a concentration of first catalyst 362 proximate inner core 324 is detectably higher than a concentration of first catalyst 362 at other locations within component 80. Thus, after inner core 324 is removed from component 80 to form internal passage 82, the concentration of first catalyst 362 proximate interior wall 100 is detectably higher than the concentration of first catalyst 362 at other locations within component 80. Moreover, in some such embodiments, first catalyst 362 lines at least a portion of interior wall 100 that defines internal passage 82.

Figure 6:
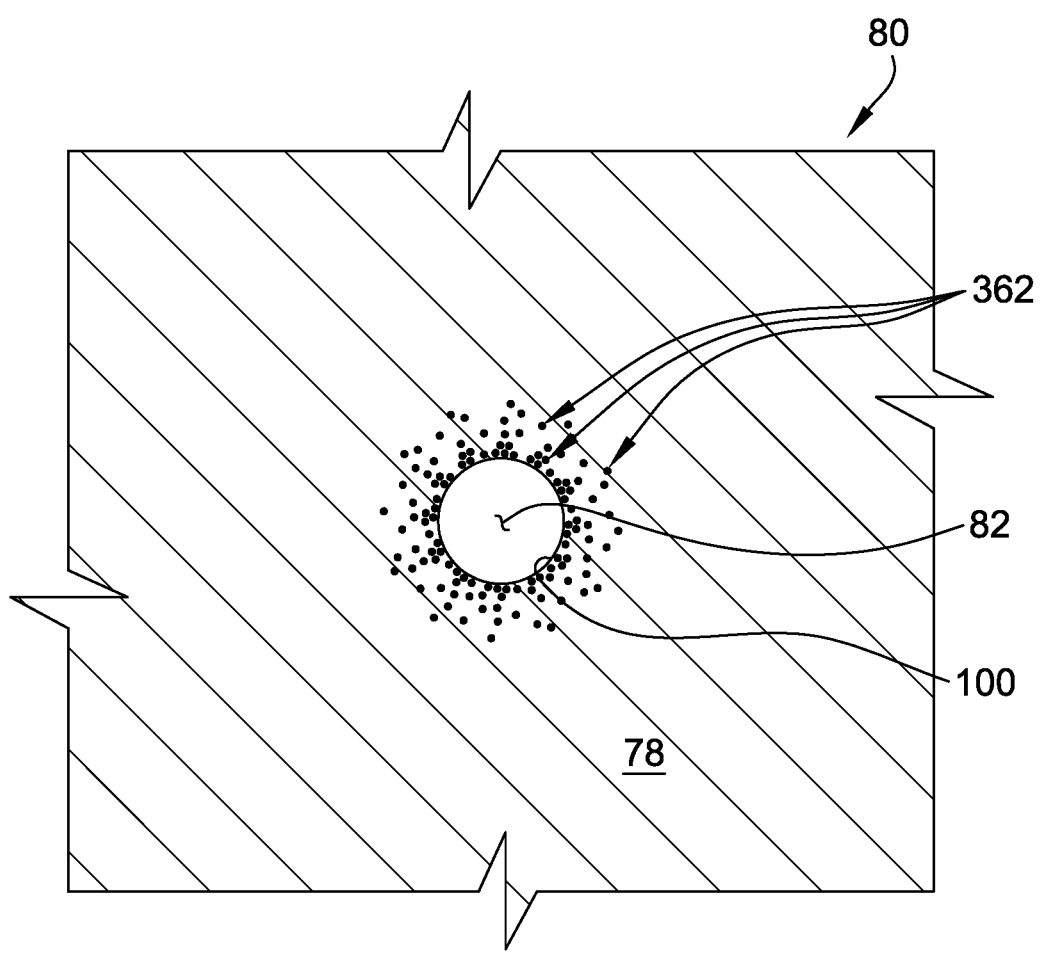
FIG. 6 is a cross-section of the component of FIG. 2, taken along lines 6-6 shown in FIG. 2.

For example, FIG. 6 is a cross-section of component 80 taken along lines 6-6 shown in FIG. 2, and schematically illustrates a gradient distribution of first catalyst 362 proximate interior wall 100. A distribution of first material 322 within component 80 is omitted from FIG. 6 for clarity. In some embodiments, a concentration of first catalyst 362 proximate interior wall 100 is sufficient to establish a catalytic effect associated with first catalyst 362 along at least a portion of interior wall 100. Moreover, in some embodiments, a concentration of first catalyst 362 proximate interior wall 100 is sufficient such that at least a portion of first catalyst 362 lines at least a portion of interior wall 100 that defines internal passage 82.

Moreover, in certain embodiments in which hollow structure 320 includes materials in addition to first material 322 and first catalyst 362, the additional materials, such as, but not limited to, second material 372, are distributed proximate interior wall 100 in similar fashion after component 80 is formed. For example, a concentration of second material 372 proximate interior wall 100 is sufficient such that second material 372 lines at least a portion of interior wall 100 that defines internal passage 82. For another example, a concentration of second material 372 proximate interior wall 100 is sufficient to establish a catalysis-promoting effect associated with second material 372 along at least a portion of interior wall 100. For another example, second material 372 is a bond coat material, and a concentration of second material 372 proximate interior wall 100 is sufficient to facilitate bonding first catalyst 362 to component material 78 and/or first material 322 proximate interior wall 100.

In the exemplary embodiment, inner core material 326 is a refractory ceramic material selected to withstand a high temperature environment associated with the molten state of component material 78 used to form component 80. For example, but without limitation, inner core material 326 includes at least one of silica, alumina, and mullite. Moreover, in the exemplary embodiment, inner core material 326 is selectively removable from component 80 to form internal passage 82. For example, but not by way of limitation, inner core material 326 is removable from component 80 by a suitable process that does not substantially degrade component material 78, such as, but not limited to, a suitable chemical leaching process. In certain embodiments, inner core material 326 is selected based on a compatibility with, and/or a removability from, component material 78, first material 322, and/or first catalyst 362. In alternative embodiments, inner core material 326 is any suitable material that enables component 80 to be formed as described herein.

In some embodiments, jacketed core 310 is formed by filling hollow structure 320 with inner core material 326. For example, but not by way of limitation, inner core material 326 is injected as a slurry into hollow structure 320, and inner core material 326 is dried within hollow structure 320 to form jacketed core 310. Moreover, in certain embodiments, hollow structure 320 substantially structurally reinforces inner core 324, thus reducing potential problems that would be associated with production, handling, and use of an unreinforced inner core 324 to form component 80 in some embodiments. For example, in certain embodiments, inner core 324 is a relatively brittle ceramic material subject to a relatively high risk of fracture, cracking, and/or other damage. Thus, in some such embodiments, forming and transporting jacketed core 310 presents a much lower risk of damage to inner core 324, as compared to using an unjacketed inner core 324. Similarly, in some such embodiments, forming a suitable pattern around jacketed core 310 to be used for investment casting of mold 300, such as by injecting a wax pattern material into a pattern die around jacketed core 310, presents a much lower risk of damage to inner core 324, as compared to using an unjacketed inner core 324. Thus, in certain embodiments, use of jacketed core 310 presents a much lower risk of failure to produce an acceptable component 80 having internal passage 82 defined therein, as compared to the same steps if performed using an unjacketed inner core 324 rather than jacketed core 310. Thus, jacketed core 310 facilitates obtaining advantages associated with positioning inner core 324 with respect to mold 300 to define internal passage 82, while reducing or eliminating fragility problems associated with inner core 324. In alternative embodiments, hollow structure 320 does not substantially structurally reinforce inner core 324.

For example, in certain embodiments, characteristic width 330 of inner core 324 is within a range from about 0.050 cm (0.020 inches) to about 1.016 cm (0.400 inches), and wall thickness 328 of hollow structure 320 is selected to be within a range from about 0.013 cm (0.005 inches) to about 0.254 cm (0.100 inches). More particularly, in some such embodiments, characteristic width 330 is within a range from about 0.102 cm (0.040 inches) to about 0.508 cm (0.200 inches), and wall thickness 328 is selected to be within a range from about 0.013 cm (0.005 inches) to about 0.038 cm (0.015 inches). For another example, in some embodiments, characteristic width 330 of inner core 324 is greater than about 1.016 cm (0.400 inches), and/or wall thickness 328 is selected to be greater than about 0.254 cm (0.100 inches). In alternative embodiments, characteristic width 330 is any suitable value that enables the resulting internal passage 82 to perform its intended function, and wall thickness 328 is selected to be any suitable value that enables jacketed core 310 to function as described herein.

In certain embodiments, hollow structure 320 is formed using a suitable additive manufacturing process. For example, FIG. 7 is a schematic sectional view of an embodiment of hollow structure 320 formed from first material 322 and first catalyst 362. In the exemplary embodiment, hollow structure 320 extends from a first end 350 to an opposite second end 352, and includes a radially inner layer of first catalyst 362 and a radially outer layer of first material 322 that each extend from first end 350 to second end 352, such that first catalyst 362 defines interior portion 360 of hollow structure 320 and first material 322 defines outer wall 380 of hollow structure 320.

To form hollow structure 320, a computer design model of hollow structure 320 is sliced into a series of thin, parallel planes between first end 350 and second end 352, such that a distribution of each of first material 322 and first catalyst 362 within each plane is defined. A computer numerically controlled (CNC) machine deposits successive layers of first material 322 and first catalyst 362 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and first catalyst 362 in each layer. Three such representative layers are indicated as layers 366, 368, and 370. In some embodiments, the successive layers each including first material 322 and first catalyst 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and first catalyst 362 are deposited using any suitable process that enables hollow structure 320 to be formed as described herein.

In some embodiments, the formation of hollow structure 320 by an additive manufacturing process enables hollow structure 320 to be formed with a distribution of first catalyst 362 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 to be formed with an integral distribution of first catalyst 362 proximate interior wall 100 (shown, for example, in FIG. 6) that would be difficult and/or relatively more costly to (i) produce by other methods of forming component 80, and/or (ii) add to component 80 in a separate process after initial formation of component 80 in mold 300.

Alternatively, in some embodiments, jacketed core 310 is formed by applying first catalyst 362 to interior portion 360 of hollow structure 320 as a coating. In some such embodiments, applying first catalyst 362 as a coating to hollow structure 320 is relatively inexpensive as compared to additive manufacture.

For example, in certain embodiments, first catalyst 362 is applied to hollow structure 320 in a bulk coating process, such as, but not limited to, a vapor phase deposition process or chemical vapor deposition process. In some such embodiments, outer wall 380 of hollow structure 320 is masked such that only interior portion 360 of hollow structure 320 is coated. Alternatively, outer wall 380 and interior portion 360 are both coated, and the coating on outer wall 380 is, for example, diffused into component material 78 when component 80 is cast.

For another example, first catalyst 362 is applied to interior portion 360 of hollow structure 320 in a slurry injection process, such as, but not limited to, injecting a slurry that includes first catalyst 362 and/or its precursors into hollow structure 320, heat treating the slurry to produce a layer of first catalyst 362, and then removing the residual slurry from hollow structure 320. In some such embodiments, applying the coating solely to hollow structure 320 enables slurry deposition processes to be used without a need to successively orient the entirety of component 80 during the heat treating process to produce a uniform thickness of first catalyst 362.

Additionally or alternatively, in some embodiments, first catalyst 362 is applied to interior portion 360 of hollow structure 320 in a slurry dipping process, such as, but not limited to, dipping an entirety of hollow structure 320 in a slurry that includes first catalyst 362 and/or its precursors. In some such embodiments, outer wall 380 of hollow structure 320 is masked such that only interior portion 360 of hollow structure 320 is coated. Alternatively, outer wall 380 and interior portion 360 are both coated, and the coating on outer wall 380 is, for example, diffused into component material 78 when component 80 is cast.

In alternative embodiments, first catalyst 362 is applied to hollow structure 320 in any other suitable fashion that enables jacketed core 310 to function as described herein. Moreover, in certain embodiments in which additional materials, such as, but not limited to, second material 372, are used to form hollow structure 320, hollow structure 320 is integrally formed with and/or coated with the additional materials in any of the processes described above for first catalyst 362, and/or in any other suitable fashion that enables jacketed core 310 to function as described herein.

For another example, FIG. 8 is a schematic sectional view of another embodiment of hollow structure 320 formed from first material 322 and first catalyst 362. In the exemplary embodiment, hollow structure 320 again includes a layer of first material 322 that extends from first end 350 to second end 352. Hollow structure 320 also includes a layer of first catalyst 362 that extends over at least one predefined first longitudinal portion 354 of interior portion 360 of hollow structure 320, radially inward of first material 322. In the exemplary embodiment, the at least one predefined first longitudinal portion 354 is a plurality of spaced apart first longitudinal portions 354.

To form hollow structure 320, a computer design model of hollow structure 320 is again sliced into a series of thin, parallel planes between first end 350 and second end 352, such that a distribution of each of first material 322 and, for first longitudinal portions 354, first catalyst 362 within each plane is defined. A computer numerically controlled (CNC) machine deposits successive layers of first material 322 and, for first longitudinal portions 354, first catalyst 362 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, first catalyst 362 in each layer. Three such representative layers are indicated as layers 366, 368, and 370. In some embodiments, the successive layers each including first material 322 and, for first longitudinal portions 354, first catalyst 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and first catalyst 362 are deposited using any suitable process that enables hollow structure 320 to be formed as described herein.

In some embodiments, the formation of hollow structure 320 by an additive manufacturing process again enables hollow structure 320 to be formed with a distribution of first catalyst 362 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 again to be formed with an integral distribution of first catalyst 362 proximate interior wall 100 (shown in FIG. 6) that would be difficult and/or relatively more costly to (i) produce by other methods of forming component 80, and/or (ii) add to component 80 in a separate process after initial formation of component 80 in mold 300. In particular, the formation of hollow structure 320 by an additive manufacturing process enables component 80 to be formed with first catalyst 362 distributed only at selected longitudinal locations along interior wall 100.

For another example, FIG. 9 is a schematic sectional view of another embodiment of hollow structure 320 formed from first material 322, first catalyst 362, and a second catalyst 382. For example, internal passage 82 is configured to facilitate a dual-catalyst chemical reaction. In the exemplary embodiment, hollow structure 320 again includes a layer of first material 322 that extends from first end 350 to second end 352. Hollow structure 320 also includes a layer of first catalyst 362 that extends over at least one predefined first longitudinal portion 354 of interior portion 360 of hollow structure 320 radially inward of first material 322, and a layer of second catalyst 382 that extends over at least one predefined second longitudinal portion 356 of interior portion 360 of hollow structure 320 radially inward of first material 322. In the exemplary embodiment, the at least one predefined first longitudinal portion 354 is a plurality of first longitudinal portions 354, and the at least one predefined second longitudinal portion 356 is a plurality of second longitudinal portions 356 that alternate with the plurality of first longitudinal portions 354 along interior portion 360.

To form hollow structure 320, a computer design model of hollow structure 320 is again sliced into a series of thin, parallel planes between first end 350 and second end 352, such that a distribution within each plane of each of first material 322, first catalyst 362 for first longitudinal portions 354, and second catalyst 382 for second longitudinal portions 356, is defined. A computer numerically controlled (CNC) machine deposits successive layers of first material 322, first catalyst 362, and/or second catalyst 382 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, first catalyst 362, and, for second longitudinal portions 356, second catalyst 382 in each layer. Three such representative layers are indicated as layers 366, 368, and 370. In some embodiments, the successive layers each including first material 322 and, for first longitudinal portions 354, first catalyst 362, and, for second longitudinal portions 356, second catalyst 382 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322, first catalyst 362, and/or second catalyst 382 are deposited using any suitable process that enables hollow structure 320 to be formed as described herein.

In some embodiments, the formation of hollow structure 320 by an additive manufacturing process enables hollow structure 320 to be formed with a distribution of first catalyst 362 and second catalyst 382 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 to be formed with an integral distribution of first catalyst 362 proximate selected portions of interior wall 100 (shown in FIG. 6), and a similar integral distribution of second catalyst 382 proximate other selected portions of interior wall 100, that would be difficult and/or relatively more costly to (i) produce by other methods of forming component 80, and/or (ii) add to component 80 in a separate process after initial formation of component 80 in mold 300.

For another example, FIG. 10 is a schematic sectional view of another embodiment of hollow structure 320 formed from first material 322, first catalyst 362, and second catalyst 382. The exemplary embodiment is substantially similar to the embodiment shown in FIG. 9, except that at least one of plurality of second longitudinal portions 356 and plurality of first longitudinal portions 354 is spaced apart along interior portion 360 from others of plurality of second longitudinal portions 356 and plurality of first longitudinal portions 354.

To form hollow structure 320, a computer design model of hollow structure 320 is again sliced into a series of thin, parallel planes between first end 350 and second end 352, such that a distribution within each plane of each of first material 322, first catalyst 362 for first longitudinal portions 354, and second catalyst 382 for second longitudinal portions 356, is defined. A computer numerically controlled (CNC) machine deposits successive layers of first material 322, first catalyst 362, and/or second catalyst 382 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, first catalyst 362, and, for second longitudinal portions 356, second catalyst 382 in each layer. Three such representative layers are indicated as layers 366, 368, and 370. In some embodiments, the successive layers each including first material 322 and, for first longitudinal portions 354, first catalyst 362, and, for second longitudinal portions 356, second catalyst 382 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322, first catalyst 362, and/or second catalyst 382 are deposited using any suitable process that enables hollow structure 320 to be formed as described herein.

In some embodiments, the formation of hollow structure 320 by an additive manufacturing process again enables hollow structure 320 to be formed with a distribution of first catalyst 362 and second catalyst 382 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 to be formed with an integral distribution of first catalyst 362 proximate selected portions of interior wall 100 (shown in FIG. 6), and a similar integral distribution of second catalyst 382 proximate other selected portions of interior wall 100, that would be difficult and/or relatively more costly to (i) produce by other methods of forming component 80, and/or (ii) add to component 80 in a separate process after initial formation of component 80 in mold 300.

In certain embodiments, jacketed core 310 is configured to form internal passage 82 having increased surface area to improve a catalytic performance of first catalyst 362. For example, interior portion 360 of hollow structure 320 is formed with a complex cross-sectional perimeter (not shown), such that inner core 324 defines a corresponding complex cross-sectional perimeter of internal passage 82 when component 80 is formed. First catalyst 362 disposed proximate interior wall 100 defining the complex cross-sectional perimeter of internal passage 82 increases a total surface area of first catalyst 362 defined per unit length of internal passage 82 for a given cross-sectional footprint of internal passage 82.

For another example, FIG. 11 is a schematic cross-section of another embodiment of jacketed core 310 taken along lines 4-4 shown in FIG. 3. In the exemplary embodiment, jacketed core 310 includes first catalyst 362 disposed on interior portion 360 of hollow structure 320 adjacent at least a portion of inner core 324, and first material 322 disposed adjacent outer wall 380. In some embodiments, first catalyst 362 again is selected to facilitate a suitable chemical reaction within internal passage 82.

In addition, in the exemplary embodiment, hollow structure 320 includes at least one strut 390 extending from a first end 394 adjacent a first location on interior portion 360 to a second end 396 adjacent a second location on interior portion 360. The at least one strut 390 thus divides inner core 324 into a plurality of longitudinally extending chambers 392. In the exemplary embodiment, an interior portion of each strut 390 is formed by first material 322, and first catalyst 362 also is disposed along the at least one strut 390 adjacent inner core 324 in each chamber 392. In an alternative embodiment, each strut 390 is formed substantially from first catalyst 362.

In the exemplary embodiment, when component 80 (shown in FIG. 2) is formed in mold 300 (shown in FIG. 3), first material 322 and first catalyst 362 are at least partially absorbed into component material 78, including first material 322 and/or first catalyst 362 disposed within the at least one strut 390. Thus, each chamber 392 defines a corresponding chamber within internal passage 82, and a wall is defined between each chamber of internal passage 82 corresponding to the at least one strut 390. In some embodiments, component 80 again includes an integral distribution of first catalyst 362 proximate interior wall 100 as shown in FIG. 6, and includes a similar integral distribution of first catalyst 362 proximate the wall corresponding to strut 390. Thus, a use of jacketed core 310 including the at least one strut 390 dividing inner core 324 into chambers 392 increases a total surface area of first catalyst 362 defined per unit length of internal passage 82 for a given cross-sectional footprint of internal passage 82.

In some embodiments, first catalyst 362 extends over at least one predefined first longitudinal portion 354 of interior portion 360 and strut 390 of hollow structure 320, radially inward of first material 322, as described above with respect to FIG. 8. Alternatively, first catalyst 362 extends over substantially an entire longitudinal extent of interior portion 360 and strut 390.

In some embodiments, hollow structure 320 again is formed using a suitable additive manufacturing process, as described above with respect to the embodiments shown in FIGS. 7 and 8. Alternatively, hollow structure 320 is formed in any suitable fashion that enables hollow structure 320 to function as described herein.

For another example, FIG. 12 is a schematic cross-section of another embodiment of jacketed core 310 taken along lines 4-4 shown in FIG. 3. The embodiment shown in FIG. 12 is identical to that described with respect to FIG. 11, except the at least one strut 390 is embodied as a pair of struts 390 that divide inner core 324 into four chambers 392. As compared to the embodiment of FIG. 11, which illustrates a single strut 390, a use of jacketed core 310 including two struts 390 dividing inner core 324 into our chambers 392 further increases a total surface area of first catalyst 362 defined per unit length of internal passage 82 for a given cross-sectional footprint of internal passage 82. However, a cross-sectional flow area of internal passage 82 is correspondingly decreased.

For another example, FIG. 13 is a schematic cross-section of another embodiment of jacketed core 310 taken along lines 4-4 shown in FIG. 3. The embodiment shown in FIG. 13 is similar to that described with respect to FIG. 11. However, in the exemplary embodiment, first catalyst 362 is disposed on interior portion 360 of hollow structure 320, and second catalyst 382 is disposed along the at least one strut 390 adjacent inner core 324 in each chamber 392. In alternative embodiments, at least one chamber 392 includes first catalyst 362 and second catalyst 382 disposed in any suitable fashion on interior portion 360 and the at least one strut 390 proximate inner core 324.

In the exemplary embodiment, when component 80 (shown in FIG. 2) is formed in mold 300 (shown in FIG. 3), first material 322, first catalyst 362, and second catalyst 382 are at least partially absorbed into component material 78, including first material 322 and/or second catalyst 382 disposed within the at least one strut 390. Again, each chamber 392 defines a corresponding chamber within internal passage 82, and a wall is defined between each chamber of internal passage 82 corresponding to the at least one strut 390. In some embodiments, component 80 again includes an integral distribution of first catalyst 362 proximate interior wall 100 as shown in FIG. 6, and includes a similar integral distribution of second catalyst 382 proximate the wall corresponding to strut 390. Thus, each chamber 392 defines a dual-catalyst chamber in internal passage 82 after component 80 is formed in mold 300.

In some embodiments, in each chamber 392, first catalyst 362 extends over at least one predefined first longitudinal portion 354 of interior portion 360, and second catalyst 382 extends over at least one predefined second longitudinal portion 356 of strut 390 of hollow structure 320, similar to as described above with respect to FIGS. 9 and 10. Alternatively, at least one of first catalyst 362 and second catalyst 382 extends over substantially an entire longitudinal extent of interior portion 360 and/or strut 390.

In some embodiments, hollow structure 320 again is formed using a suitable additive manufacturing process, as described above with respect to the embodiments shown in FIGS. 9 and 10. Alternatively, hollow structure 320 is formed in any suitable fashion that enables hollow structure 320 to function as described herein.

For another example, FIG. 14 is a schematic sectional view of a portion of another exemplary component 80 that includes internal passage 82 having a plurality of interior passage features 98. FIG. 15 is a schematic perspective cutaway view of another exemplary jacketed core 310 for use in mold assembly 301 to form component 80 having interior passage features 98 as shown in FIG. 14. In particular, a portion of hollow structure 320 is cut away in the view of FIG. 15 to illustrate features of inner core 324. FIG. 16 is a schematic sectional view of a portion of another hollow structure 320 for use in forming jacketed core 310. In the exemplary embodiment, hollow structure 320 again is formed from first material 322 and first catalyst 362.

With reference to FIGS. 14-16, internal passage 82 again is generally defined by interior wall 100 of component 80, and interior passage features 98 are shaped to define local variations in a flow path defined by internal passage 82. For example, but not by way of limitation, interior passage features 98 are turbulators that extend radially inward from interior wall 100 generally towards a center of internal passage 82, and are shaped to disrupt a thermal boundary layer flow along interior wall 100 to enhance catalysis of a reaction in internal passage 82 during operation of rotary machine 10 (shown in FIG. 1). Alternatively, interior passage features 98 are any structure shaped to define local variations in the flow path defined by internal passage 82. In the exemplary embodiment, component 80 proximate each interior passage feature 98 is at least partially formed by first catalyst 362, as will be described herein. A distribution of first material 322 within component 80 is omitted from FIG. 11 for clarity.

In certain embodiments, interior portion 360 of hollow structure 320 is shaped to define the at least one interior passage feature 98. In some such embodiments, inner core 324 is complementarily shaped by interior portion 360 of hollow structure 320 such that inner core 324 defines internal passage 82 including at least one interior passage feature 98 defined therein. For example, inner core 324 is complementarily shaped by interior portion 360 to include at least one complementary feature 331, and the at least one complementary feature 331 has a shape complementary to a shape of at least one interior passage feature 98.

For example, in the illustrated embodiment, the at least one complementary feature 331 is a plurality of recessed features 334 defined in an exterior surface of inner core 324. Each recessed feature 334 has a shape complementary to a shape of a corresponding interior passage feature 98. More specifically, in the illustrated embodiment, interior portion 360 of hollow structure 320 includes protrusions 341 formed as a plurality of stud shapes that extend radially inwardly on interior portion 360 of hollow structure 320, such that when inner core material 326 is added to hollow structure 320, protrusions 341 define recessed features 334. Thus, when molten component material 78 is introduced into mold cavity 304 and hollow structure 320 is at least partially absorbed into molten component material 78, molten component material 78 fills in against the at least one complementary feature 331, and cooled component material 78 within the at least one complementary feature 331 forms the at least one interior passage feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 defines the at least one interior passage feature 98.

In the exemplary embodiment, interior portion 360 of hollow structure 320 includes at least protrusions 341 formed at least partially from first catalyst 362, and a remainder of hollow structure 320 formed from first material 322. In alternative embodiments, hollow structure 320 includes any suitable distribution of first material 322 and first catalyst 362. In some embodiments, after jacketed core 310 is positioned with respect to mold 300 (shown in FIG. 3) and molten component material 78 is added to mold cavity 304 and cooled to form component 80, a concentration of first catalyst 362 proximate interior passage features 98 is detectably higher than a concentration of first catalyst 362 at other locations within component 80. Moreover, in some such embodiments, first catalyst 362 forms at least a portion of interior passage features 98.

To form hollow structure 320, a computer design model of hollow structure 320 again is sliced into a series of thin, parallel planes between first end 350 and second end 352, such that a distribution of each of first material 322 and first catalyst 362 within each plane is defined. A computer numerically controlled (CNC) machine deposits successive layers of first material 322 and, for layers in which at least one protrusion 341 is partially defined, first catalyst 362 from first end 350 to second end 352 in accordance with the model slices to form hollow structure 320. For example, the additive manufacturing process is again suitably configured for alternating deposition of each of a plurality of metallic and/or metallic and ceramic materials, and the alternating deposition is suitably controlled according to the computer design model to produce the defined distribution of first material 322 and first catalyst 362 in each layer. One such representative layer is indicated as layer 366. In some embodiments, the successive layers each including first material 322 and, for layers in which at least one protrusion 341 is partially defined, first catalyst 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and first catalyst 362 are deposited using any suitable process that enables hollow structure 320 to be formed as described herein.

In some embodiments, the formation of hollow structure 320 by an additive manufacturing process enables hollow structure 320 to be formed with protrusions 341 formed at least partially from first catalyst 362 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 to be formed with interior passage features 98 formed at least partially from first catalyst 362 that would be difficult and/or relatively more costly to (i) produce by other methods of forming component 80, and/or (ii) add to component 80 in a separate process after initial formation of component 80 in mold 300. Thus, in certain embodiments, fluid flow in internal passage 82 is subjected to a combination of turbulation and catalysis.

In alternative embodiments, at least some protrusions 341 are formed at least partially from second catalyst 382 (shown in FIG. 9), such that at least some interior passage features 98 are formed at least partially from second catalyst 382 to define a dual catalyst internal passage 82. Alternatively or additionally, first catalyst 362 that extends over at least one predefined first longitudinal portion 354 of interior portion 360 to increase a surface area for catalysis, and/or second catalyst 382 extends over at least one predefined second longitudinal portion 356 of interior portion 360 to define a dual catalyst internal passage 82 having increased surface area for catalysis, as shown in FIGS. 9 and 10.

FIG. 17 is a schematic sectional view of a portion of another exemplary component 80 that includes internal passage 82 having a plurality of interior passage features 98. FIG. 18 is a schematic perspective cutaway view of another exemplary jacketed core 310 for use in mold assembly 301 to form component 80 having interior passage features 98 as shown in FIG. 17. In particular, a portion of hollow structure 320 is cut away in the view of FIG. 18 to illustrate features of inner core 324. FIG. 19 is a schematic sectional view of a portion of another hollow structure 320 for use in forming jacketed core 310 shown in FIG. 18. Hollow structure 320 again is formed from first material 322 and first catalyst 362.

With reference to FIGS. 17-19, internal passage 82 again is generally defined by interior wall 100 of component 80, and interior passage features 98 again are shaped to define local variations in a flow path defined by internal passage 82. In the exemplary embodiment, component 80 proximate each interior passage feature 98 again is at least partially formed by first catalyst 362, as will be described herein. A distribution of first material 322 within component 80 is omitted from FIG. 17 for clarity.

In certain embodiments, interior portion 360 of hollow structure 320 again is shaped to define the at least one interior passage feature 98. In some such embodiments, inner core 324 again is complementarily shaped by interior portion 360 of hollow structure 320 such that inner core 324 defines internal passage 82 including at least one interior passage feature 98 defined therein. More specifically, in the exemplary embodiment, interior portion 360 of hollow structure 320 is shaped to define the at least one interior passage feature 98 as a rifled groove along interior wall 100 of internal passage 82. Correspondingly, interior portion 360 includes a rifled protrusion 341 shaped to define the at least one complementary feature 331 of inner core 324 as a rifled groove structure 339 when inner core material 326 is added to hollow structure 320. Thus, when molten component material 78 is introduced into mold cavity 304 and hollow structure 320 is at least partially absorbed into molten component material 78, molten component material 78 fills in against the at least one complementary feature 331, and cooled component material 78 within the at least one complementary feature 331 again forms the at least one interior passage feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 again defines the at least one interior passage feature 98.

In the exemplary embodiment, hollow structure 320 includes at least protrusions 341 formed at least partially from first catalyst 362, and a remainder of hollow structure 320 formed from first material 322. In alternative embodiments, hollow structure 320 includes any suitable distribution of first material 322 and first catalyst 362. In some embodiments, after jacketed core 310 is positioned with respect to mold 300 (shown in FIG. 3) and molten component material 78 is added to mold cavity 304 and cooled to form component 80, a concentration of first catalyst 362 proximate interior passage features 98 is detectably higher than a concentration of first catalyst 362 at other locations within component 80. Moreover, in some such embodiments, first catalyst 362 forms at least a portion of interior passage features 98.

To form hollow structure 320, a computer design model of hollow structure 320 again is sliced into a series of thin, parallel planes between first end 350 and second end 352, such that a distribution of each of first material 322 and first catalyst 362 within each plane is defined. A computer numerically controlled (CNC) machine deposits successive layers of first material 322 and, for layers in which protrusion 341 is partially defined, first catalyst 362 from first end 350 to second end 352 in accordance with the model slices to form hollow structure 320. For example, the additive manufacturing process is again suitably configured for alternating deposition of each of a plurality of metallic and/or metallic and ceramic materials, and the alternating deposition is suitably controlled according to the computer design model to produce the defined distribution of first material 322 and first catalyst 362 in each layer. One such representative layer is indicated as layer 366. In some embodiments, the successive layers each including first material 322 and, for layers in which protrusion 341 is partially defined, first catalyst 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and first catalyst 362 are deposited using any suitable process that enables hollow structure 320 to be formed as described herein.

In some embodiments, the formation of hollow structure 320 by an additive manufacturing process again enables hollow structure 320 to be formed with protrusions 341 formed at least partially from first catalyst 362 that would be difficult and/or relatively more costly to produce by other methods of forming hollow structure 320, particularly, but not only, for hollow structures having relatively high length-to-diameter ratios. Correspondingly, the formation of hollow structure 320 by an additive manufacturing process enables component 80 to be formed with interior passage features 98 formed at least partially from first catalyst 362 that would be difficult and/or relatively more costly to (i) produce by other methods of forming component 80, and/or (ii) add to component 80 in a separate process after initial formation of component 80 in mold 300. Thus, in certain embodiments, fluid flow in internal passage 82 is subjected to a combination of turbulation and catalysis.

In alternative embodiments, at least a portion of protrusion 341 is formed at least partially from second catalyst 382 (shown in FIG. 9), such that a portion of interior passage feature 98 is formed at least partially from second catalyst 382 to define a dual catalyst internal passage 82. Alternatively or additionally, first catalyst 362 that extends over at least one predefined first longitudinal portion 354 of interior portion 360 to increase a surface area for catalysis, and/or second catalyst 382 extends over at least one predefined second longitudinal portion 356 of interior portion 360 to define a dual catalyst internal passage 82 having increased surface area for catalysis, as shown in FIGS. 9 and 10.

With reference to FIGS. 14-19, although interior passage features 98 are illustrated studs and/or rifled grooves, it should be understood that this disclosure contemplates interior passage features 98 having any suitable additional or alternative shape that enables internal passage 82 to function for its intended purpose, and interior portion 360 of hollow structure 320 and complementary features 331 of inner core 324 having any suitable corresponding shape that enables interior passage features 98 to be formed as described herein. Moreover, although the illustrated embodiments show each embodiment of interior passage features 98 as having a substantially identical repeating shape, it should be understood that this disclosure contemplates interior passage features 98 having any suitable combination of different shapes that enables internal passage 82 to function for its intended purpose, and interior portion 360 of hollow structure 320 and complementary features 331 of inner core 324 having any suitable corresponding combination of different shapes that enables interior passage features 98 to be formed as described herein.

Figure 20:
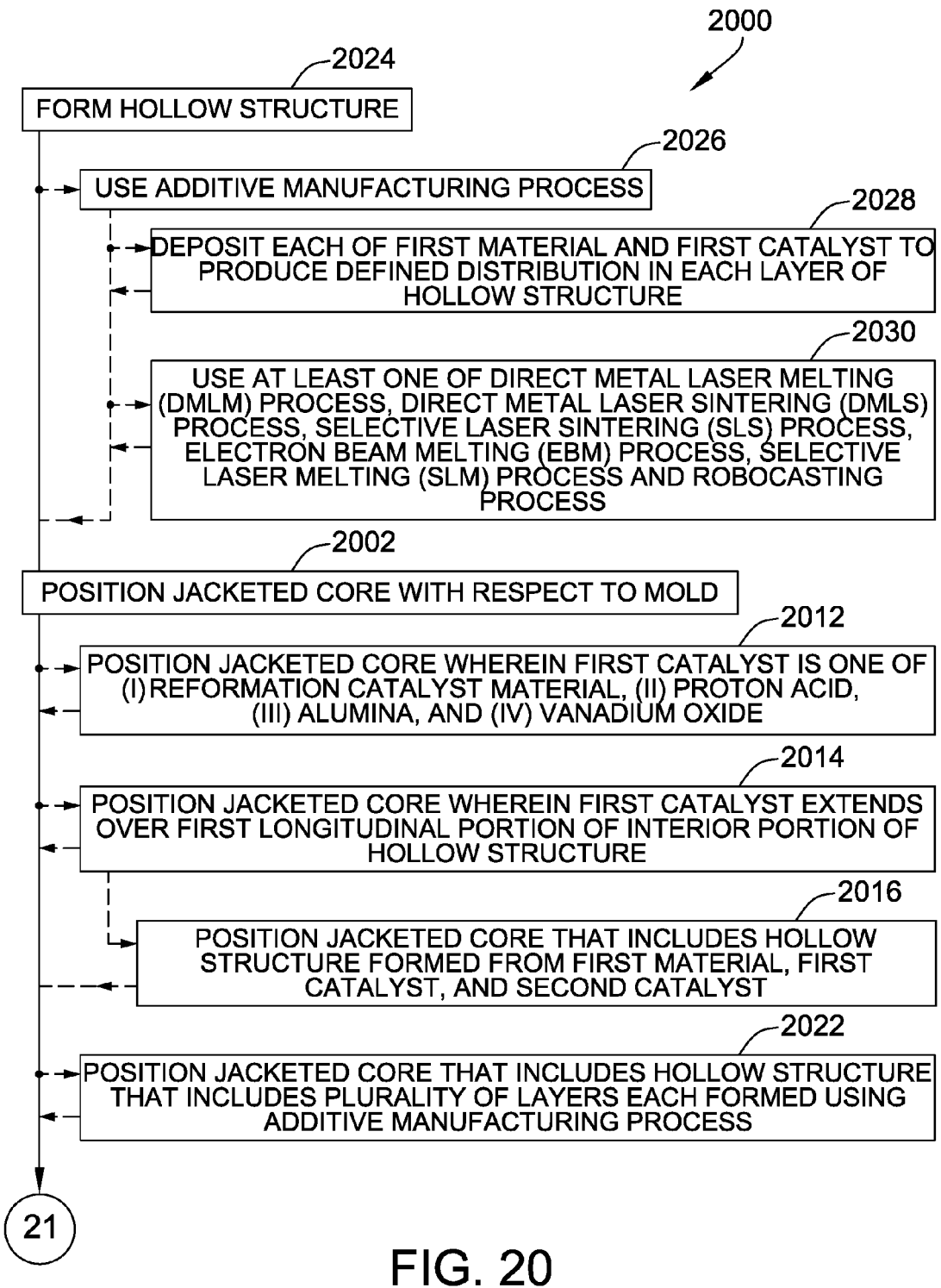
FIG. 20 is a flow diagram of an exemplary method of forming a component having an internal passage defined therein, such as a component for use with the rotary machine shown in FIG. 1.
Figure 21:
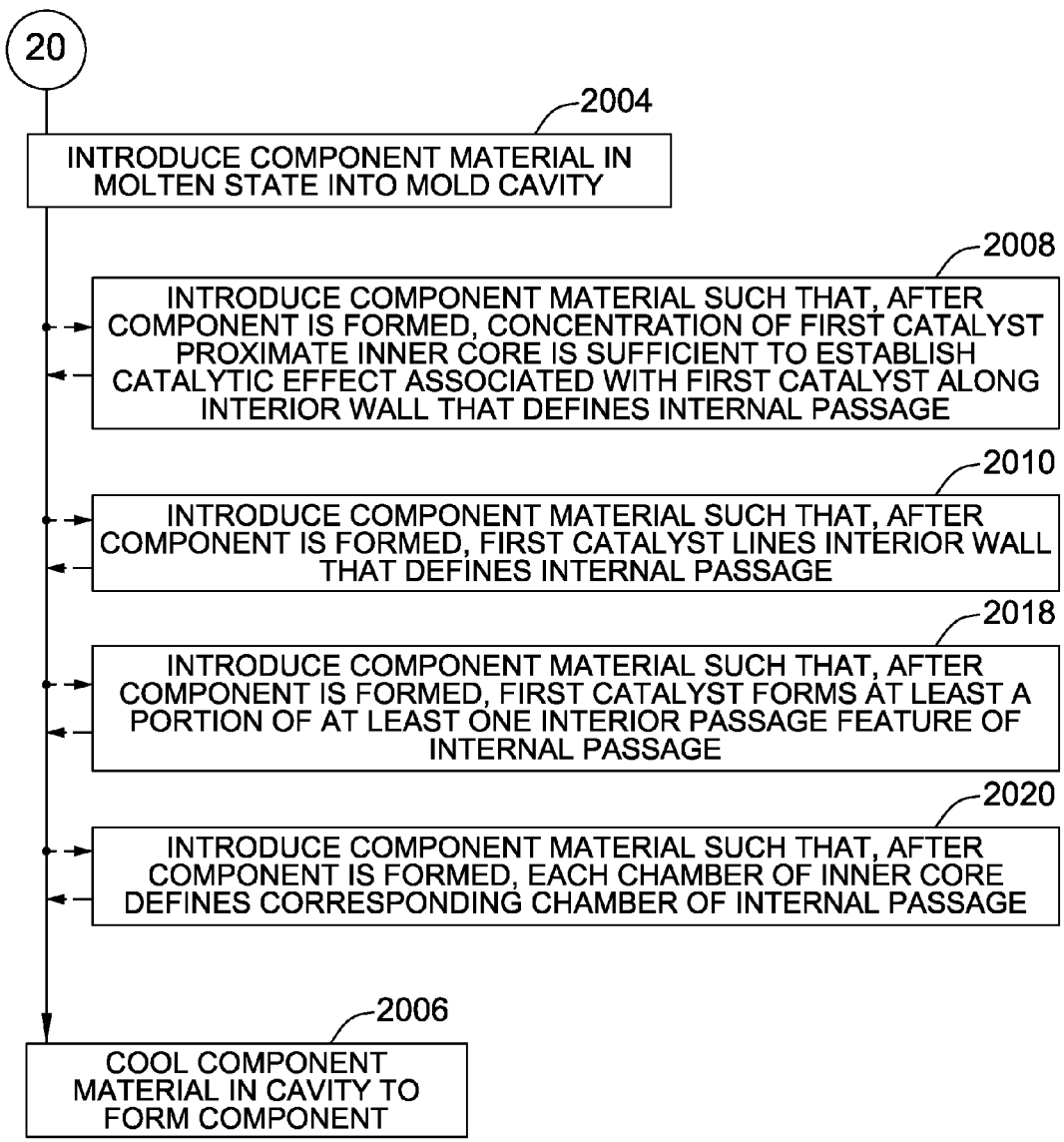
FIG. 21 is a continuation of the flow diagram from FIG. 20.

An exemplary method 2000 of forming a component, such as component 80, having an internal passage defined therein, such as internal passage 82, is illustrated in a flow diagram in FIGS. 20 and 21. With reference also to FIGS. 1-19, exemplary method 2000 includes positioning 2002 a jacketed core, such as jacketed core 310, with respect to a mold, such as mold 300. The jacketed core includes a hollow structure, such as hollow structure 320, formed from at least a first material, such as first material 322, and a first catalyst, such as first catalyst 362. The jacketed core also includes an inner core, such as inner core 324, disposed within the hollow structure. Method 2000 also includes introducing 2004 a component material, such as component material 78, in a molten state into a cavity of the mold, such as mold cavity 304, to form the component, and cooling 2006 the component material in the cavity to form the component. The inner core defines the internal passage within the component.

In some embodiments, the step of introducing 2004 the component material into the cavity includes introducing 2008 the component material such that, after the component is formed, a concentration of the first catalyst proximate the inner core is sufficient to establish a catalytic effect associated with the first catalyst along at least a portion of an interior wall, such as interior wall 100, that defines the internal passage within the component.

In certain embodiments, the step of introducing 2004 the component material into the cavity includes introducing

2010 the component material such that, after the component is formed, the first catalyst lines at least a portion of an interior wall, such as interior wall 100, that defines the internal passage within the component.

In some embodiments, the step of positioning 2002 the jacketed core includes positioning 2012 the jacketed core wherein the first catalyst is selected from one of (i) a reformation catalyst, (ii) a proton acid, (iii) alumina, and (iv) vanadium oxide.

In certain embodiments, the step of positioning 2002 the jacketed core includes positioning 2014 the jacketed core wherein the first catalyst extends over at least one predefined first longitudinal portion, such as first longitudinal portion 354, of an interior portion of the hollow structure, such as interior portion 360, radially inward of the first material. In some such embodiments, the step of positioning 2014 the jacketed core includes positioning 2016 the jacketed core that includes the hollow structure formed from the first material, the first catalyst, and a second catalyst, such as second catalyst 382. The second catalyst extends over at least one predefined second longitudinal portion of the interior portion of the hollow structure, such as second longitudinal portion 356, radially inward of the first material.

In certain embodiments, an interior portion of the hollow structure, such as interior portion 360, is at least partially formed from the first catalyst, the interior portion is shaped to define at least one interior passage feature of the internal passage, such as interior passage feature 98, and the step of introducing 2004 the component material into the cavity includes introducing 2018 the component material such that, after the component is formed, the first catalyst forms at least a portion of the at least one interior passage feature.

In some embodiments, the hollow structure includes at least one strut, such as the at least one strut 390, that divides the inner core into a plurality of longitudinally extending chambers, such as chambers 392, and the first catalyst is disposed along the at least one strut adjacent the inner core. The step of introducing 2004 the component material into the cavity includes introducing 2020 the component material such that, after the component is formed, each of the plurality of chambers of the inner core defines a corresponding chamber of the internal passage.

In certain embodiments, the step of positioning 2002 the jacketed core includes positioning 2022 the jacketed core that includes the hollow structure that includes a plurality of layers, such as representative layers 366, 368, and 370, each formed using an additive manufacturing process.

In some embodiments, method 2000 further includes forming 2024 the hollow structure using 2026 an additive manufacturing process. Moreover, in some such embodiments, the step of using 2026 an additive manufacturing process includes alternately depositing 2028 each of the first material and the first catalyst to produce a defined distribution of the first material and the first catalyst in each of a plurality of layers of the hollow structure, such as representative layers 366, 368, and 370. Additionally or alternatively, in some such embodiments, the step of using 2026 an additive manufacturing process includes using 2030 at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process.

The above-described jacketed core provides a cost-effective method for forming components that include internal passages defined therein with a at least one catalyst selectively positioned along the internal passage. Specifically, the jacketed core includes the inner core, which is positioned within the mold cavity to define the position of the internal passage within the component, and also includes the hollow structure, within which the inner core is disposed, formed from at least a first material and a first catalyst. The first catalyst is strategically distributed within the hollow structure, such as by an additive manufacturing process, such that the first catalyst is selectively positioned along the internal passage when the component is formed in the mold. For example, but not by way of limitation, the first catalyst is selectively positioned to facilitate a chemical reaction in a fluid that flows in the internal passage. Also, specifically, the first material and the first catalyst are each at least partially absorbable by the molten component material introduced into the mold cavity to form the component. Thus, the use of the hollow structure does not interfere with the structural or performance characteristics of the component, and does not interfere with the later removal of the inner core material from the component to form the internal passage.

An exemplary technical effect of the methods, systems, and apparatus described herein includes at least one of: (a) reducing or eliminating fragility problems associated with forming, handling, transport, and/or storage of the core used in forming a component having an internal passage defined therein; and (b) an ability to reliably and repeatably selectively position at least one catalyst along the internal passage when the component is formed in the mold, even for internal passages having nonlinear and/or complex shapes and/or characterized by high L/d ratios.

Exemplary embodiments of jacketed cores are described above in detail. The jacketed cores, and methods and systems using such jacketed cores, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use cores within mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component having an internal passage defined therein, said method comprising:
   positioning a jacketed core with respect to a mold, wherein the jacketed core includes:
      a hollow structure that extends radially inward from an outer wall to an interior portion, wherein the interior portion is formed from at least a first catalyst, wherein the hollow structure comprises a first material that extends radially from the outer wall to the at least first catalyst, and wherein the first material is metallic; and an inner core disposed within the hollow structure, wherein the first catalyst abuts the inner core;

introducing a component material in a molten state into a cavity of the mold; and cooling the component material in the cavity to form the component, wherein the inner core defines the internal passage within the component.

2. The method of claim 1, wherein said introducing the component material into the cavity comprises introducing the component material such that, after the component is formed, a concentration of the first catalyst proximate the inner core is sufficient to establish a catalytic effect associated with the first catalyst along at least a portion of an interior wall that defines the internal passage within the component.

3. The method of claim 1, wherein said introducing the component material into the cavity comprises introducing the component material such that, after the component is formed, the first catalyst lines at least a portion of an interior wall that defines the internal passage within the component.

4. The method of claim 1, wherein said positioning the jacketed core comprises positioning the jacketed core wherein the first catalyst is selected from one of (i) a reformation catalyst, (ii) a proton acid, (iii) alumina, and (iv) vanadium oxide.

5. The method of claim 1, wherein said positioning the jacketed core comprises positioning the jacketed core wherein the first catalyst extends over at least one predefined first longitudinal portion of the interior portion of the hollow structure, radially inward of the first material.

6. The method of claim 5, wherein said positioning the jacketed core comprises positioning the jacketed core that includes the hollow structure formed from the first material, the first catalyst, and a second catalyst, and wherein the second catalyst extends over at least one predefined second longitudinal portion of the interior portion of the hollow structure, radially inward of the first material.

7. The method of claim 1, wherein the interior portion is shaped to define at least one interior passage feature of the internal passage, said introducing the component material into the cavity comprises introducing the component material such that, after the component is formed, the first catalyst forms at least a portion of the at least one interior passage feature.

8. The method of claim 1, wherein the hollow structure includes at least one strut that divides the inner core into a plurality of longitudinally extending chambers, the first catalyst disposed along the at least one strut adjacent the inner core, said introducing the component material into the cavity comprises introducing the component material such that, after the component is formed, each of the plurality of chambers of the inner core defines a corresponding chamber of the internal passage.

9. The method of claim 1, wherein said positioning the jacketed core comprises positioning the jacketed core that includes the hollow structure formed using an additive manufacturing process.

10. The method of claim 1, further comprising forming the hollow structure using an additive manufacturing process.

11. The method of claim 10, wherein using an additive manufacturing process comprises alternately depositing each of the first material and the first catalyst to produce a defined distribution of the first material and the first catalyst in each of a plurality of layers of the hollow structure.

12. The method of claim 10, wherein using an additive manufacturing process comprises using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process.

13. A mold assembly for use in forming a component having an internal passage defined therein, said mold assembly comprising:

a mold defining a mold cavity therein; and a jacketed core positioned with respect to said mold, said jacketed core comprising:

a hollow structure that extends radially inward from an outer wall to an interior portion, wherein said interior portion is formed from at least a first catalyst, wherein said hollow structure comprises a first material that extends radially from said outer wall to said at least first catalyst, and wherein said first material is metallic; and an inner core disposed within said hollow structure and positioned to define the internal passage within the component when a component material in a molten state is introduced into said mold cavity and cooled to form the component, wherein said first catalyst abuts said inner core.

14. The mold assembly of claim 13, wherein said first catalyst is one of (i) a reformation catalyst, (ii) a proton acid, (iii) alumina, and (iv) vanadium oxide.

15. The mold assembly of claim 13, wherein said first catalyst extends over at least one predefined first longitudinal portion of an interior portion of said hollow structure, radially inward of said first material.

16. The mold assembly of claim 13, wherein said interior portion is shaped to define at least one interior passage feature of the internal passage when the component is formed.

17. The mold assembly of claim 13, wherein said hollow structure is formed using an additive manufacturing process.

18. A mold assembly for use in forming a component having an internal passage defined therein, said mold assembly comprising:

a mold defining a mold cavity therein; and a jacketed core positioned with respect to said mold, said jacketed core comprising:

a hollow structure formed from a first material, a first catalyst, and a second catalyst, wherein said first catalyst extends over at least one predefined first longitudinal portion of an interior portion of said hollow structure, radially inward of said first material, and said second catalyst extends over at least one predefined second longitudinal portion of said interior portion of said hollow structure, radially inward of said first material; and an inner core disposed within said hollow structure and positioned to define the internal passage within the component when a component material in a molten state is introduced into said mold cavity and cooled to form the component.

19. A mold assembly for use in forming a component having an internal passage defined therein, said mold assembly comprising:

a mold defining a mold cavity therein; and a jacketed core positioned with respect to said mold, said jacketed core comprising:

a hollow structure formed from at least a first material and a first catalyst, wherein said hollow structure further comprises at least one strut; and an inner core disposed within said hollow structure and positioned to define the internal passage within the component when a component material in a molten state is introduced into said mold cavity and cooled to form the component, wherein said at least one strut divides said inner core into a plurality of longitudinally extending chambers.

20. The mold assembly of claim 19, wherein said first catalyst is disposed along said at least one strut adjacent said inner core.

21. The mold assembly of claim 19, wherein a second catalyst is disposed along said at least one strut adjacent said inner core.

22. A mold assembly for use in forming a component having an internal passage defined therein, said mold assembly comprising:

a mold defining a mold cavity therein; and a jacketed core positioned with respect to said mold, said jacketed core comprising:

a hollow structure formed from a first material, a first catalyst, and a second material, said second material selected to be a promoter of a reaction catalyzed by said first catalyst; and an inner core disposed within said hollow structure and positioned to define the internal passage within the component when a component material in a molten state is introduced into said mold cavity and cooled to form the component.

23. A mold assembly for use in forming a component having an internal passage defined therein, said mold assembly comprising:

a mold defining a mold cavity therein; and a jacketed core positioned with respect to said mold, said jacketed core comprising:

a hollow structure comprising an outer wall, an interior portion radially inward of said outer wall, and a plurality of protrusions that extend radially inwardly from said interior portion, wherein said outer wall is formed from a first material that is metallic, and wherein said plurality of protrusions is formed at least partially from a first catalyst; and an inner core disposed within said hollow structure and positioned to define the internal passage within the component when a component material in a molten state is introduced into said mold cavity and cooled to form the component, wherein said inner core comprises complementary features that receive said plurality of protrusions.

* * * * *